US011897479B2

(12) United States Patent
Beal et al.

(10) Patent No.: US 11,897,479 B2
(45) Date of Patent: Feb. 13, 2024

(54) FRICTION ESTIMATION FOR STEERING MANEUVERS FOR STATIONARY OR SLOW-ROLLING AUTOMOBILES

(71) Applicant: The Penn State Research Foundation, University Park, PA (US)

(72) Inventors: Craig E. Beal, Lewisburg, PA (US); Sean N. Brennan, State College, PA (US)

(73) Assignees: THE PENN STATE RESEARCH FOUNDATION, University Park, PA (US); BUCKNELL UNIVERSITY, Lewisburg, PA (US)

( * ) Notice: Subject to any disclaimer, the term of this patent is extended or adjusted under 35 U.S.C. 154(b) by 145 days.

(21) Appl. No.: 17/441,787

(22) PCT Filed: Mar. 26, 2020

(86) PCT No.: PCT/US2020/024905
§ 371 (c)(1),
(2) Date: Sep. 22, 2021

(87) PCT Pub. No.: WO2020/198443
PCT Pub. Date: Oct. 1, 2020

(65) Prior Publication Data
US 2022/0169256 A1 Jun. 2, 2022

Related U.S. Application Data

(60) Provisional application No. 62/874,566, filed on Jul. 16, 2019, provisional application No. 62/823,761, filed on Mar. 26, 2019.

(51) Int. Cl.
*B60W 40/068* (2012.01)
*B60W 40/101* (2012.01)
*B60W 40/13* (2012.01)

(52) U.S. Cl.
CPC ........ *B60W 40/068* (2013.01); *B60W 40/101* (2013.01); *B60W 40/13* (2013.01);
(Continued)

(58) Field of Classification Search
CPC .. B60W 40/068; B60W 40/101; B60W 40/13; B60W 2552/40; B60W 2040/1384; B60W 2420/10; B60W 2510/202
See application file for complete search history.

(56) References Cited

U.S. PATENT DOCUMENTS 8,983,749 B1 * 3/2015 Singh ............... B60T 8/172
701/71
2004/0016594 A1 * 1/2004 Yasui ............... B62D 6/04
180/446

(Continued)

OTHER PUBLICATIONS

International Search Report dated Jun. 18, 2020; International application No. PCT/US2020/024905.

*Primary Examiner* — Peter D Nolan
*Assistant Examiner* — Mikko Okechukwu Obioha
(74) *Attorney, Agent, or Firm* — DINSMORE & SHOHL LLP

(57) ABSTRACT

A device for estimating a friction coefficient between a road surface and an automotive tire through determination of a steering torque during a steering maneuver of a slow-rolling or stationary vehicle includes a computer configured for constructing a brush model for a description of the steering torque across a contact patch between the tire and road surface. The steering torque is a torque acting on a steering axis required to overcome resistance to tire twisting on the road surface at a wheel velocity and a steering rate. The steering torque depends on a tire brush vertical load distribution and relative motion of tire brushes and the road surface. The device further includes sensors for measuring the wheel velocity and the steering rate and mechanism for (Continued)

measurements or estimation of the steering torque. The friction coefficient is estimated based on the measurements or estimation of the steering torque and the brush model.

20 Claims, 21 Drawing Sheets

(52) U.S. Cl.
CPC . *B60W 2040/1384* (2013.01); *B60W 2420/10* (2013.01); *B60W 2510/202* (2013.01); *B60W 2520/28* (2013.01); *B60W 2540/18* (2013.01); *B60W 2552/40* (2020.02)

(56) References Cited

U.S. PATENT DOCUMENTS

| | | | |
|---|---|---|---|
| 2005/0055149 A1* | 3/2005 | Kato | B62D 6/006 |
| | | | 701/80 |
| 2006/0074541 A1 | 4/2006 | Ono et al. | |
| 2007/0233352 A1* | 10/2007 | Miyashita | B60W 40/12 |
| | | | 701/82 |
| 2008/0243348 A1 | 10/2008 | Svendenius et al. | |
| 2013/0245890 A1* | 9/2013 | Kageyama | B62D 5/001 |
| | | | 701/41 |
| 2017/0369050 A1 | 12/2017 | Varnhagen et al. | |
| 2021/0188284 A1* | 6/2021 | Hassel | B60W 10/20 |
| 2021/0310932 A1* | 10/2021 | Toba | G01N 19/02 |

* cited by examiner

FIG. 7
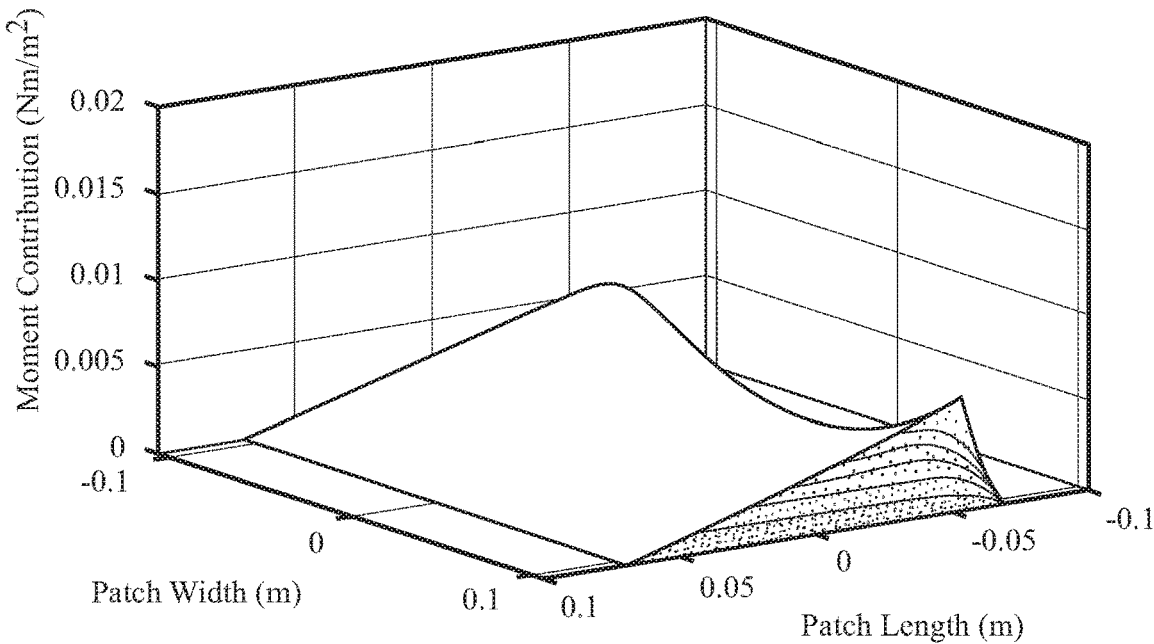
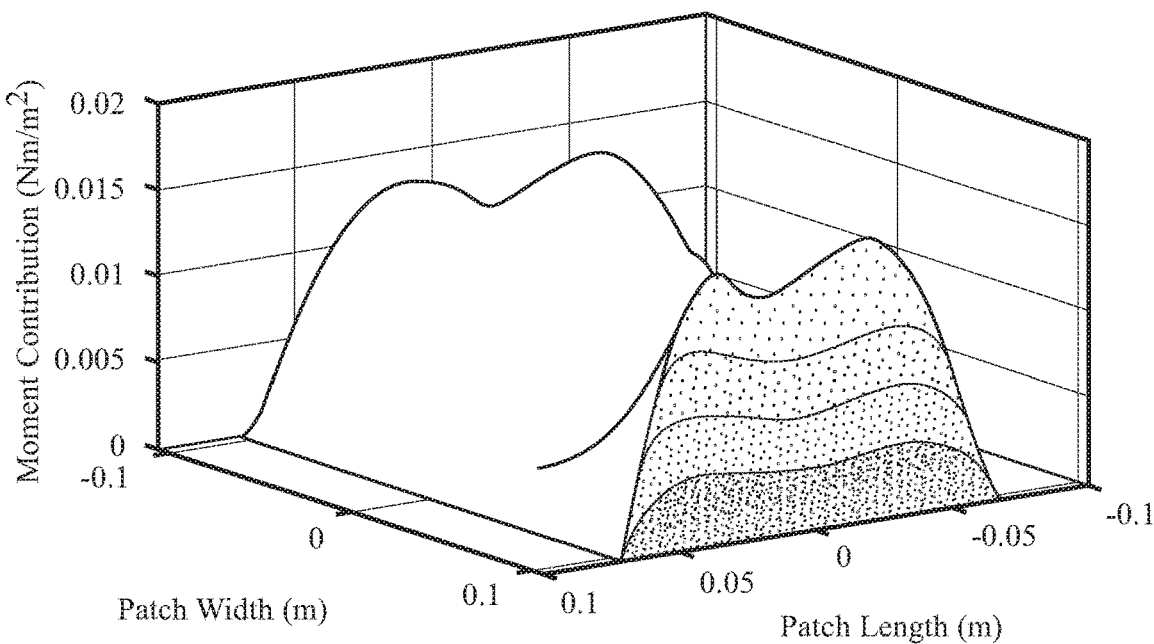
FIG. 8

FIG. 10
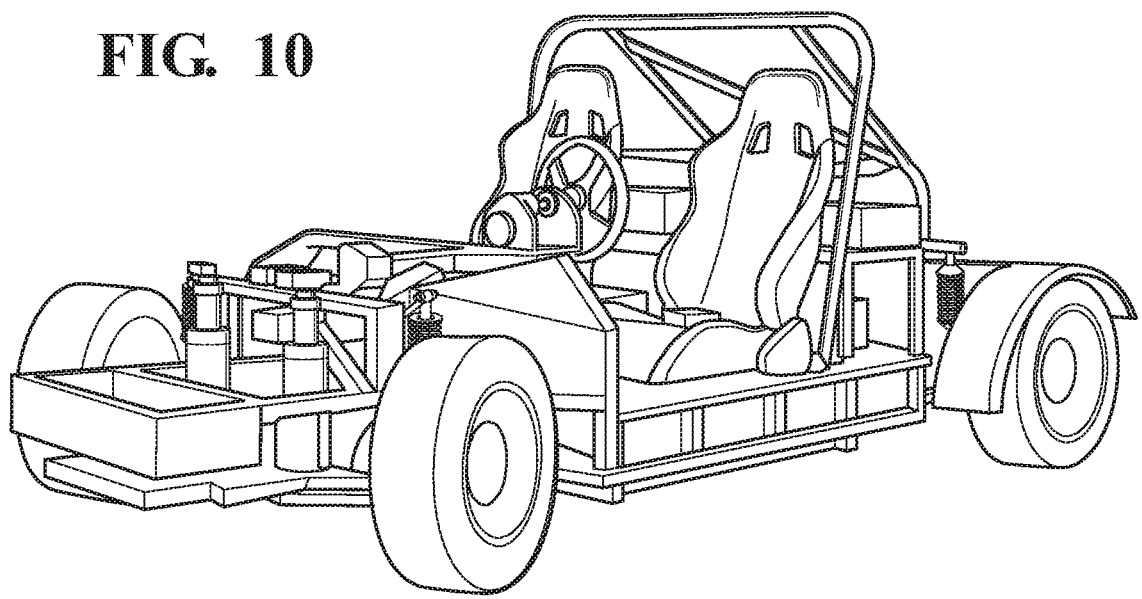
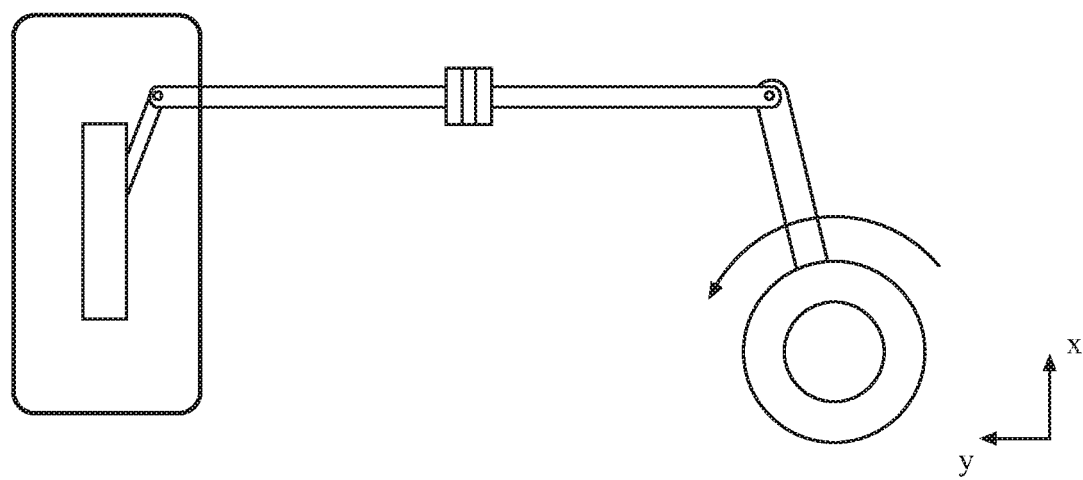
FIG. 11

FIG. 12
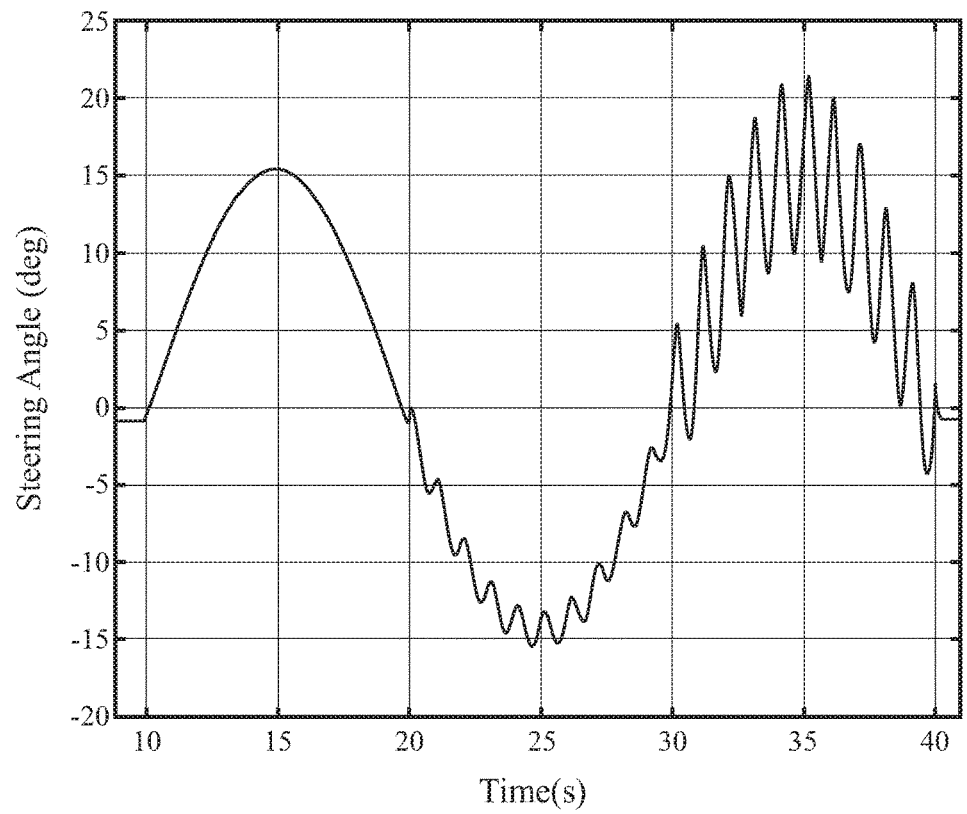
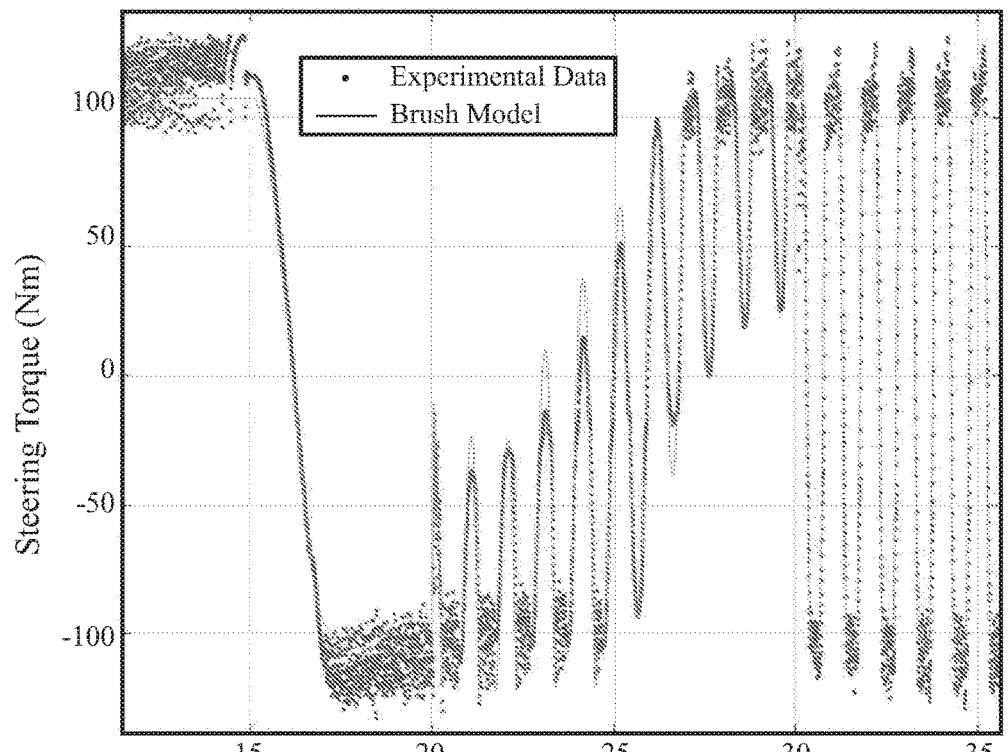
FIG. 13

FIG. 14
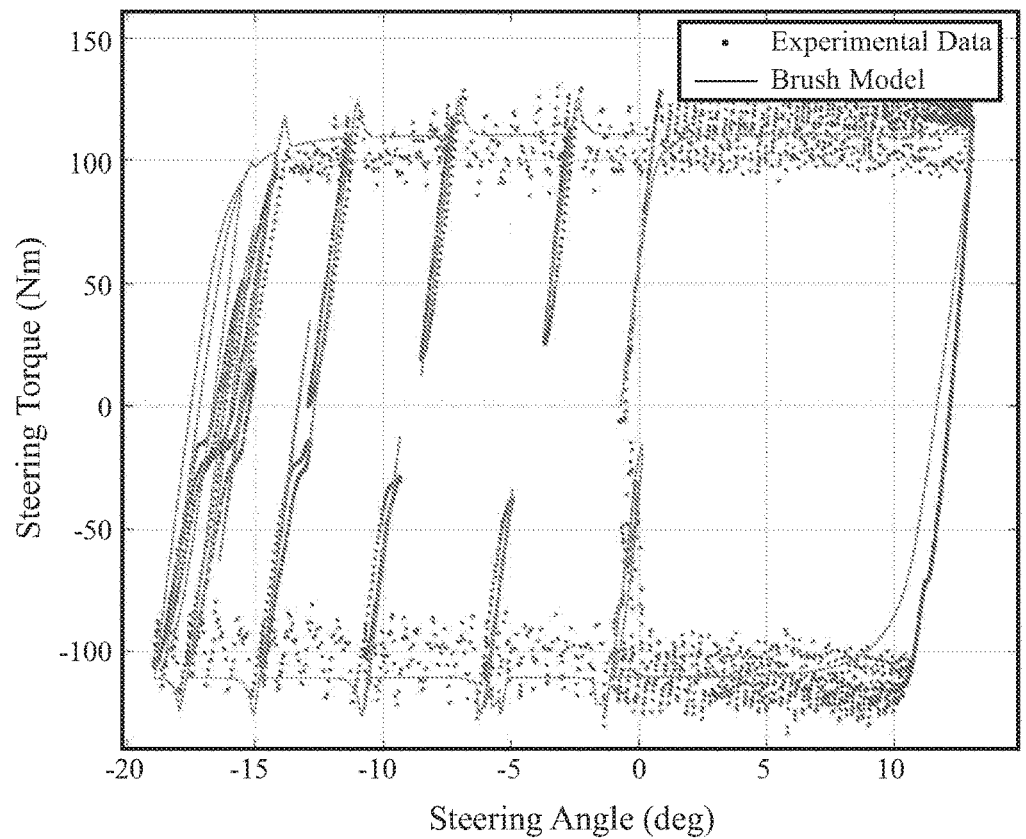
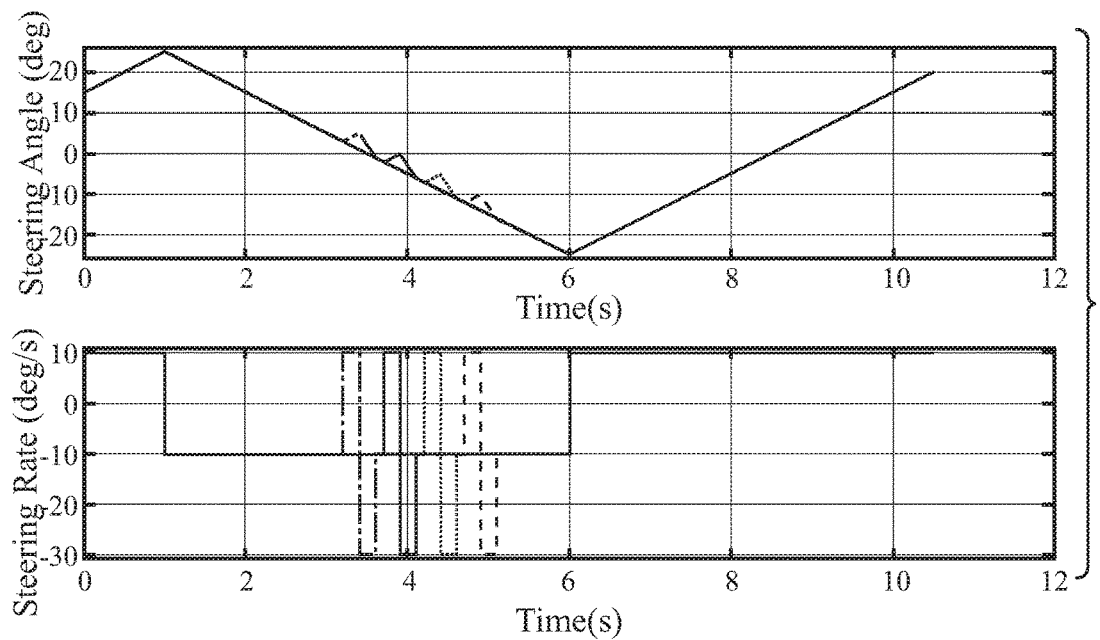
FIG. 15

FIG. 20
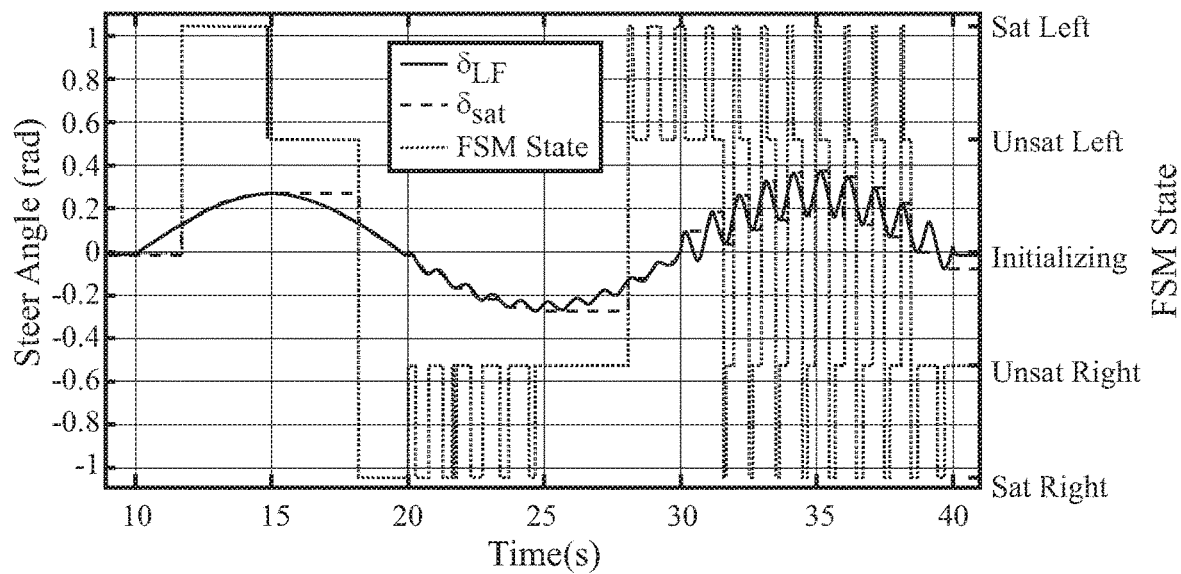
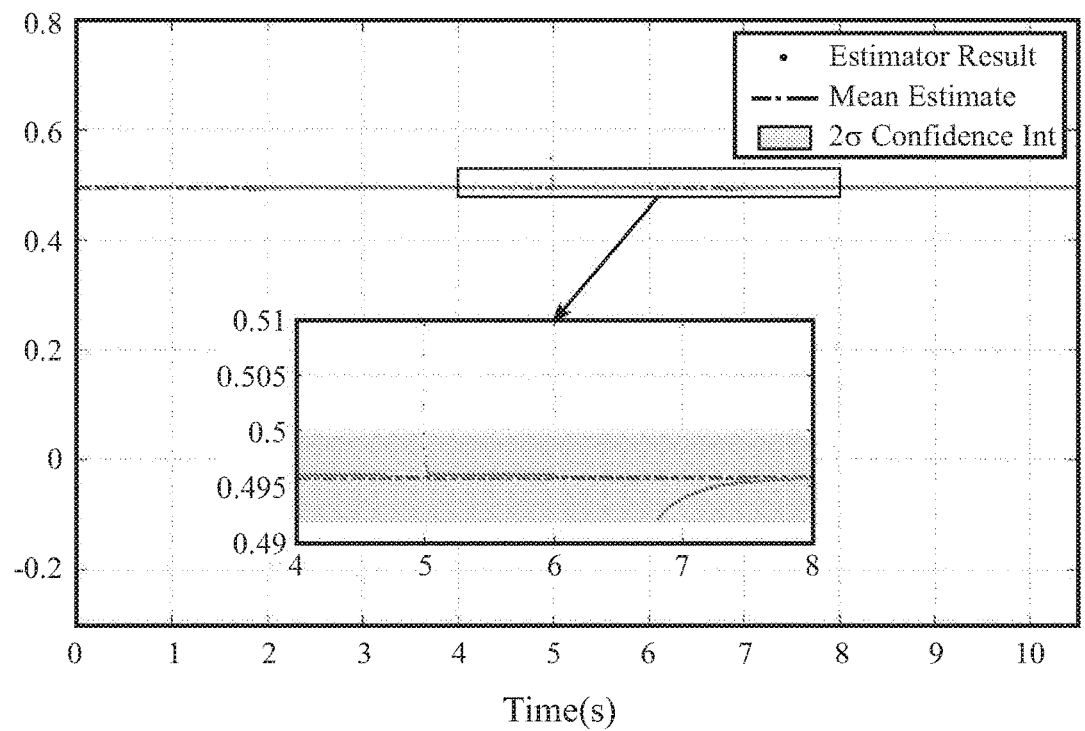
FIG. 21

FIG. 28
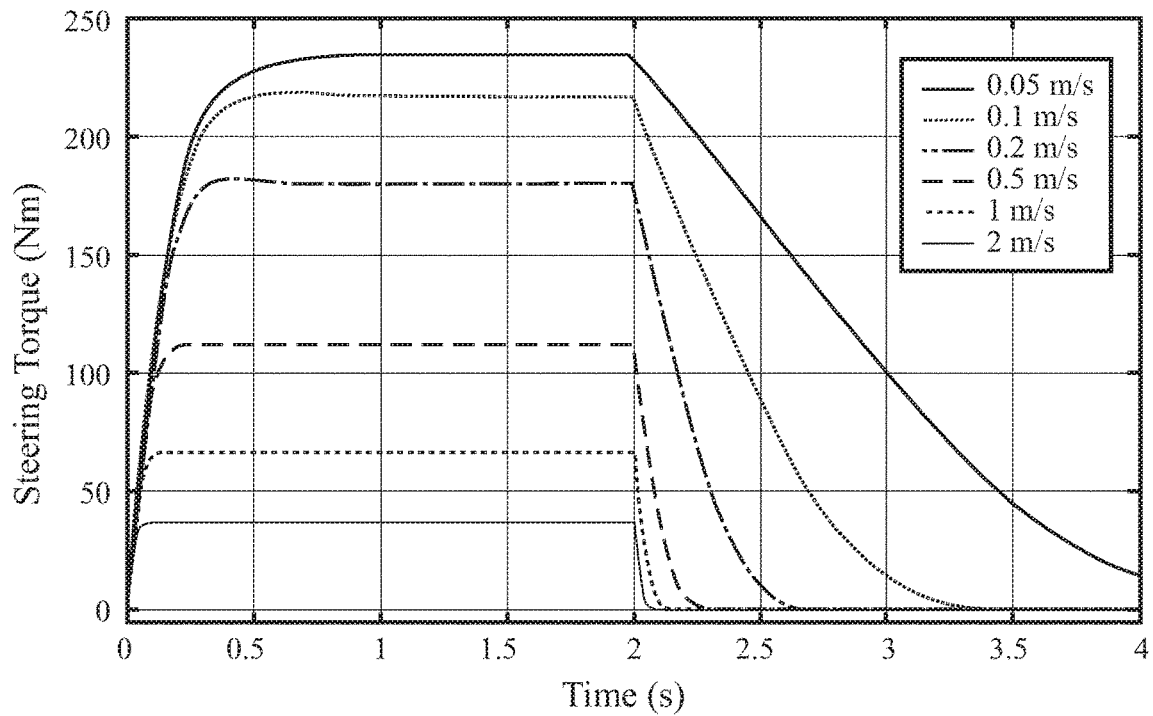
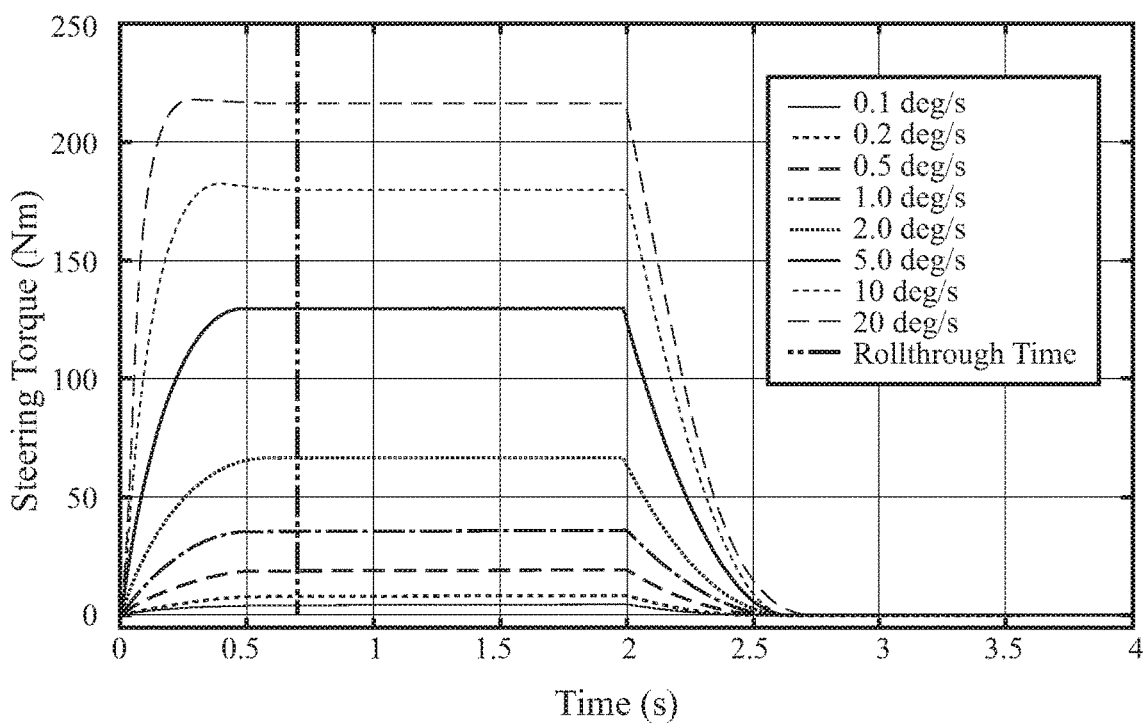
FIG. 29

FIG. 30
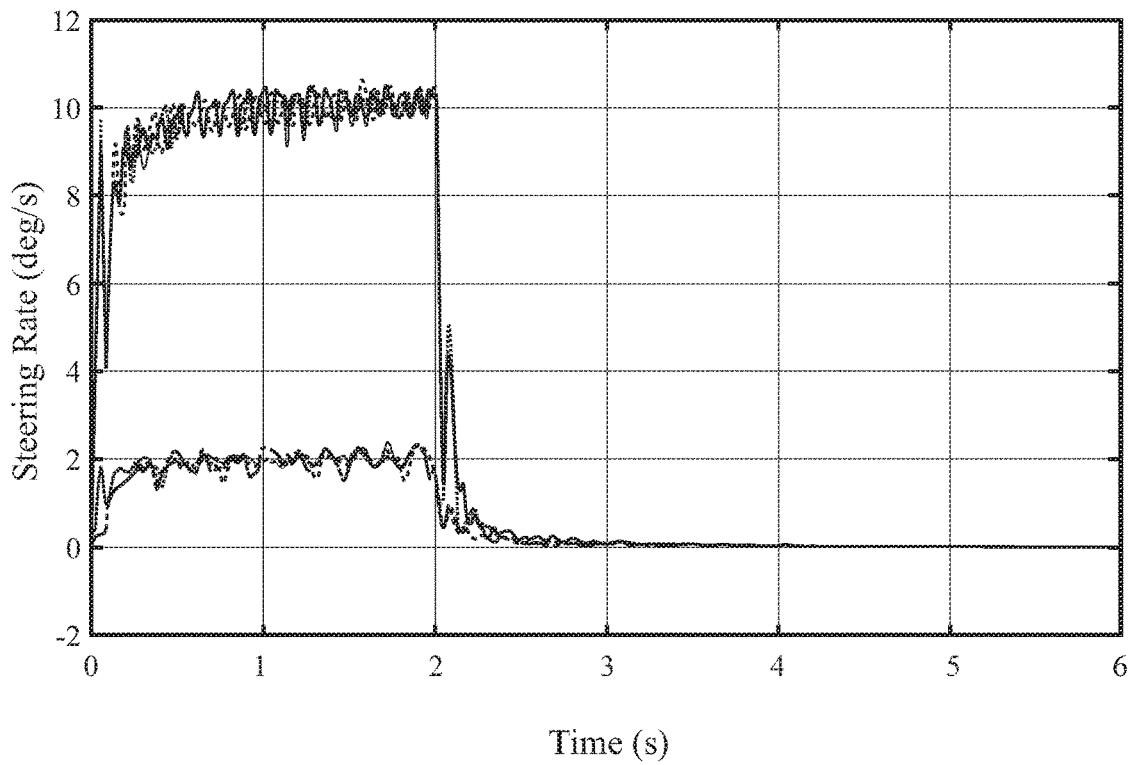
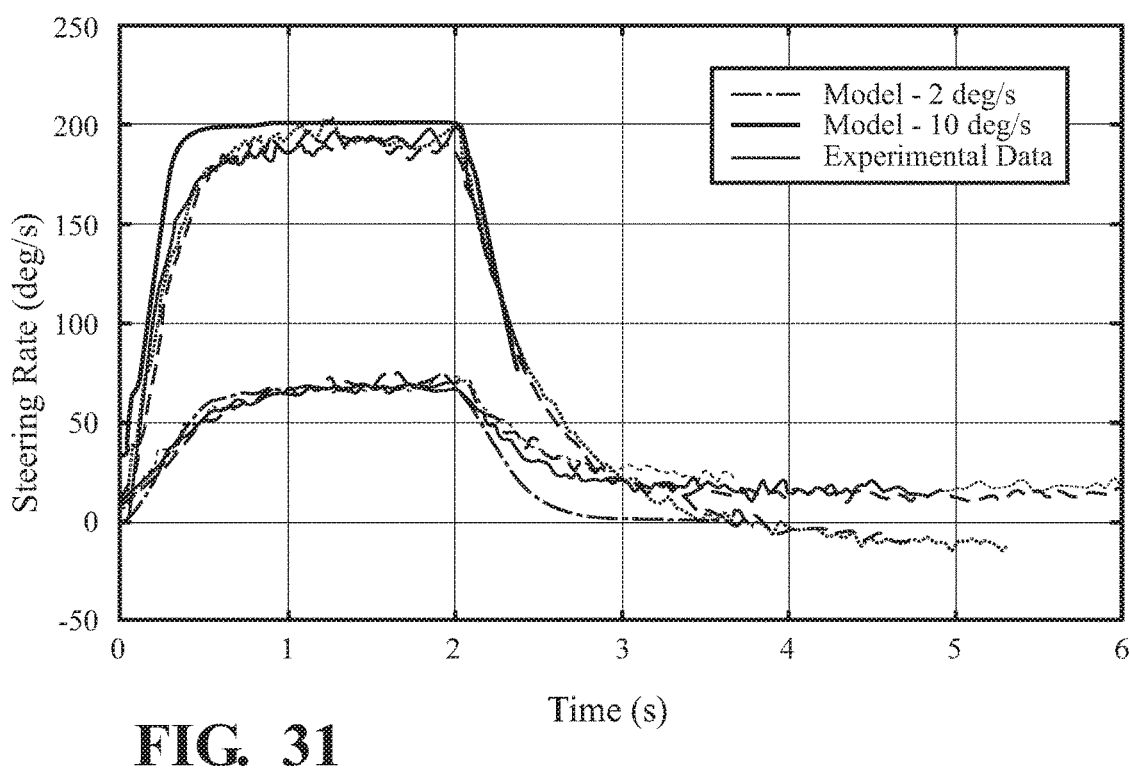
FIG. 31

FIG. 35
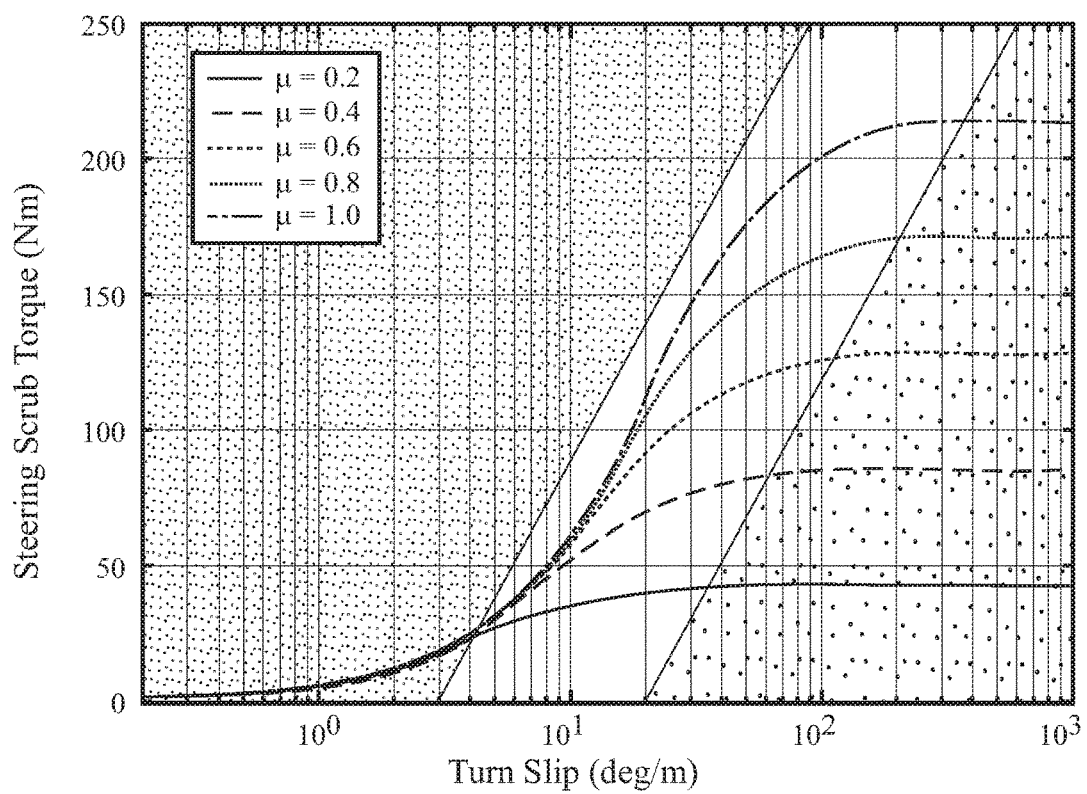
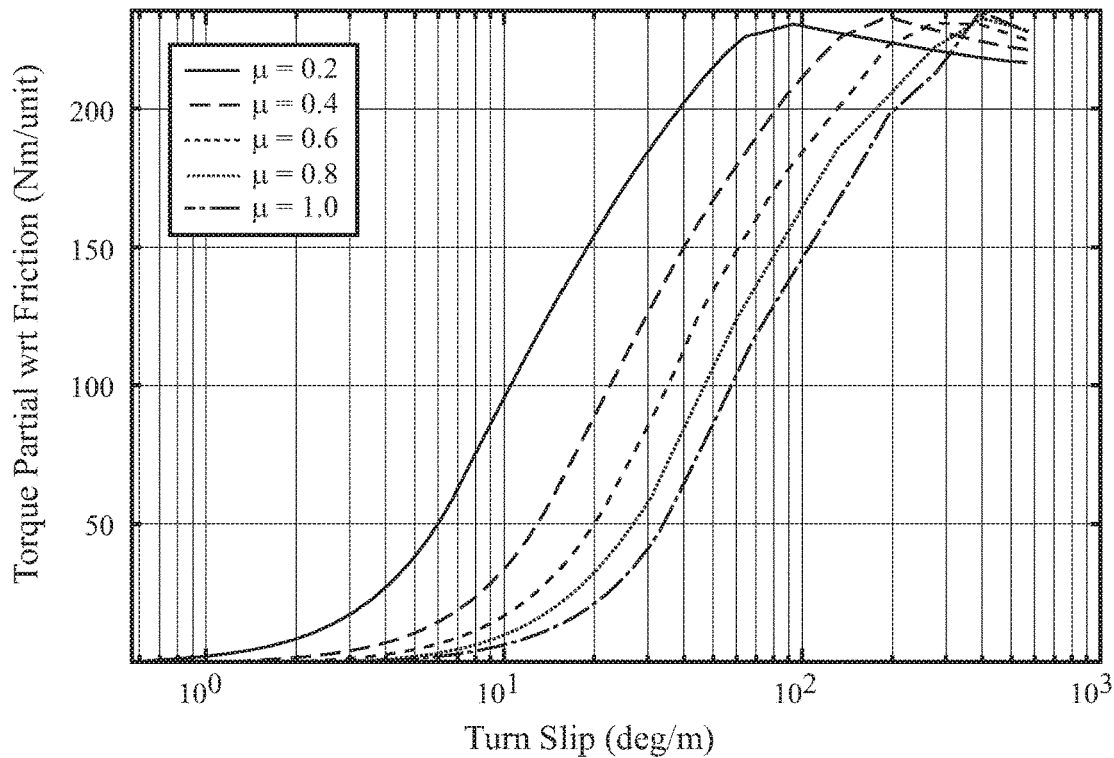
FIG. 36

FIG. 37
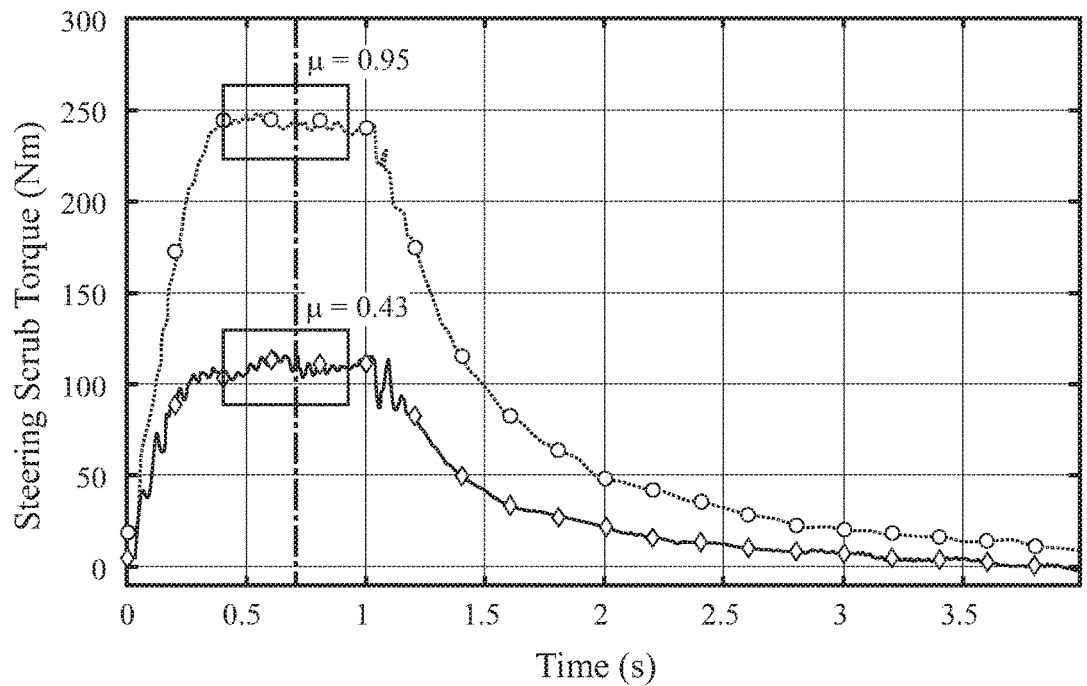
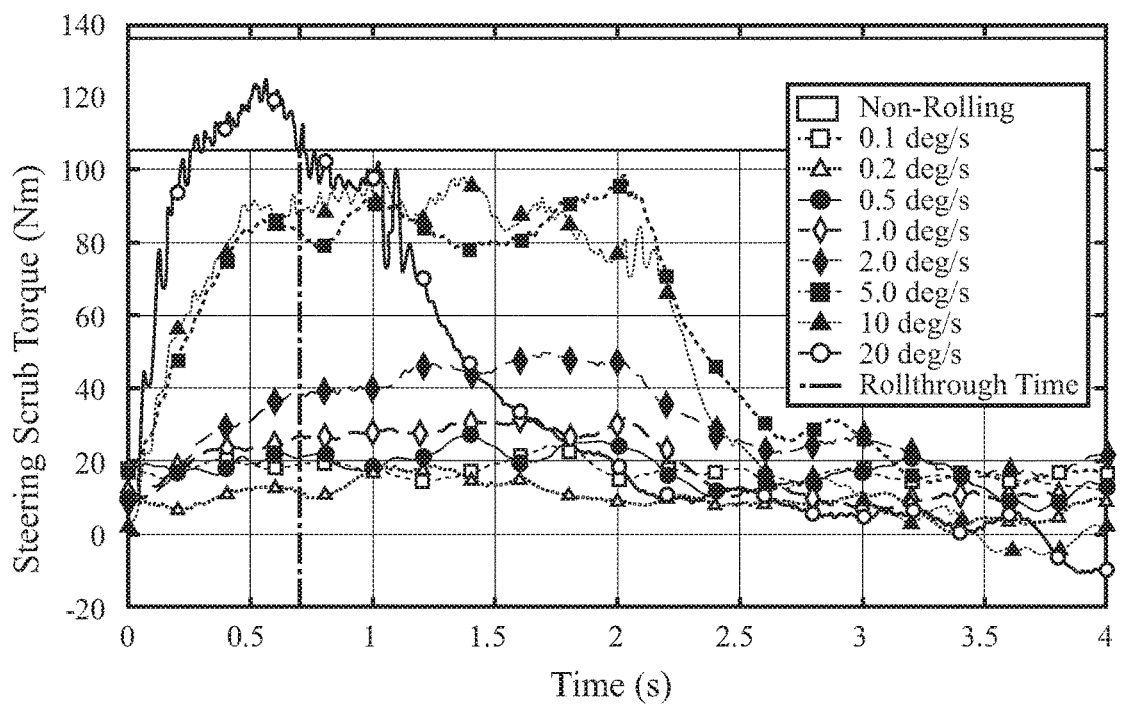
FIG. 38

FRICTION ESTIMATION FOR STEERING MANEUVERS FOR STATIONARY OR SLOW-ROLLING AUTOMOBILES

CROSS REFERENCE TO RELATED APPLICATIONS

This application is the U.S. National Stage of PCT/US2020/024905 filed Mar. 26, 2020, which claims priority from U.S. Provisional Patent Application Ser. No. 62/823,761, filed Mar. 26, 2019, and U.S. Provisional Patent Application Ser. No. 62/874,566, filed on Jul. 16, 2019, the entire contents of both are incorporated herein by reference.

GOVERNMENT SUPPORT

This invention was made with government support under Grant No. MRI1726283 awarded by the National Science Foundation. The Government has certain rights in the invention.

FIELD OF THE INVENTION

The present invention relates to estimation of friction coefficients between a tire and a road surface for a stationary or a slow-rolling automobile.

BACKGROUND OF THE INVENTION

The torque developed in the steering system of an automobile is a result of multiple interactions between a tire and the roadway surface. Models are well established for high-speed ground vehicle operation where the tire is rolling rapidly and the dominant source of tire tread stress is deformation due to lateral force on the tire. However, there is need for friction estimation between the tire and roadway surface for stationary or slow-rolling vehicles.

SUMMARY OF THE INVENTION

For situations where the vehicle is operating at low speeds or even steering when stationary, the torque required to turn the wheels is predominantly a function of the steering rate. However, the torque still can be predicted using models of the deformation of the tire rubber. The present invention provide a method for friction estimation using a model of the tire dynamics that considers the low-speed tire deformation behavior considering the interacting effects of steering while the tire is stationary or slowly rolling, allowing for the prediction of steering torques during low speed maneuvering.

According to an embodiment of the present invention, a device for estimating a friction coefficient between an automotive tire and a road surface for a slow-rolling or stationary vehicle during a steering maneuver includes sensors for measuring the wheel velocity and the steering rate, mechanism for measurements or estimation of the steering torque and a computer configured for constructing a brush model for a description of the steering torque across a contact patch between the automotive tire and road surface. The steering torque is a torque acting on a steering axis required to overcome resistance to tire twisting on the road surface at a wheel velocity and a steering rate. The steering torque can be directly measured by force transducers. Alternatively, the steering torque can also be estimated from steering system loads, steering system current draw or other mechanisms.

For the case of a stationary vehicle, the torque acting on the steering axis is required to overcome the resistance to the tire twisting on the driving surface, hence referred to as tire scrub torque. This scrub torque depends on both the vertical load distribution and the relative motion of the tire carcass and the road, each of which vary throughout the contact patch. Therefore it is useful to describe these distributed mechanics with a brush model, where the tire contact patch is broken up into individual tread elements that operate independently and are integrated over the contact patch to obtain the total torque.

The vertical load distribution may be uniform load distribution, quartic load distribution, parabolic load distribution, or a combined load distribution.

For a slow-rolling tire, the tire roll-out relaxation dynamics is taken into account that are absent in stationary steering and which have negligible effect in typical driving conditions. The model of the present invention allows for prediction of steering torques in this low-speed transition regime and demonstrates a friction sensitivity of the low-speed steering dynamics that can be leveraged to infer the surface condition.

The dynamics of the slow-rolling tire are governed by three primary mechanisms: twisting, friction, and rolling. The steering of the tire causes a twisting of the rubber against the road surface. This twisting motion results in an elastic deformation of the rubber that is dependent upon the history of steering motion. The elastic deformation will grow with increasing steering, but is ultimately limited by the second mechanism, i.e., the friction condition between the rubber and road. After a certain amount of deformation, the friction force between the tread elements and the road will be exceeded by the restorative elastic force in the rubber and the tread element will slide, creating a saturation dynamic in the tread stress. These mechanisms exist whether the tire is rolling or stationary, making the third mechanism the key difference between the stationary and slow-rolling cases. This third mechanism is the relaxation of the tire rubber as a result of the relative motion of the tread elements in the contact patch, including the replacement of rubber at the leading edge of the contact patch and the rubber leaving the ground at the trailing edge of the contact patch.

The tire brush vertical load distribution due to the rolling motion of the tire changes as the tire brushes enter or leave the contact patch such that tire brush stress distribution across the contact patch is updated at any given moment during a period. The period is the time to reach a steady-state, the steady-state being the point when the brush stress exceeds the friction force between the tire and the road surface.

The determination of the brush stress distribution due to the rolling motion comprises the brush stresses in the patch shifting to a new location in the contact patch, where the shift operation includes saturation of the brush stress to the smallest encountered product of friction coefficient and vertical pressure, and the tire brushes in the leading edge being relaxed as the tire rolls forward in the rolling direction, and the brushes traveling past the trailing edge being zeroed as they leave the patch.

The complexity of the brush model in the present invention precludes a direct inversion approach to friction estimation. Fortunately, the complexity in the model is mainly a result of the variation across the geometry of the contact patch and the dependence on the time-history of the tire motion. Examining the model behavior, it is possible to identify conditions at which the model reduces to a simpler form that is possible to invert for estimation purposes. The simplification which has the most significant impact on the model is to divide the steering angle input into periods of piece-wise monotonic steering rate. The implication of this assumption is that the brush stresses build up to saturation limited by a friction approximately equal to the sliding friction, if there has been a sufficient change in the steering angle.

In one embodiment, the friction coefficient is estimated at a minimum steering angle required for all of the tread elements in the contact patch to be in the saturated condition.

According to the present model, larger steering angles are required to accurately sense large friction coefficients due to the need to generate significant brush deformations before the brushes are friction-limited.

Only particular combinations of steering rate and speeds produce suitable steady conditions for friction identification.

For the purposes of steering system design and for friction estimation, it is useful to consider the simplest conditions under which friction significantly impacts the manoeuvre. For the physical process of the tire to produce steady behaviour that allows friction identification, a portion of the tire contact patch must be friction-limited. Within the friction-limited portion of the tire, this requires that the brushes are fully stressed due to steering, and these stresses must arise despite relaxation behaviour in the contact patch due to the brushes rolling through. Thus, there are combinations of vehicle velocities and steering rates that, for a given friction level, will produce these fully-stressed brush conditions.

The assumptions on the initial conditions are that the tire is relaxed or has been in a steady manoeuvre long enough that transients are not present. The operational assumptions are that the speed is nearly constant, and that there is a period in which roadwheels are steered at a constant rate. The tire-surface contact assumptions are that the surfaces are locally level and the area under the tire is uniform in both friction and texture.

When the wheel velocity is zero, the friction coefficient between the tire and driving surface is approximated by ratio of the steering torque generated due to steering motion when all the brushes are saturated to the integrated product of the vertical pressure distribution and location of the differential elements being integrated.

When a measured vehicle steering rate, a measured steering torque, and a measured wheel rotation rate meet an inequality criterion, the friction coefficient between the tire and road surface is approximated by the ratio of the steering torque when all the brushes are saturated to the integrated product of the vertical pressure distribution and location of the differential elements being integrated.

The embodiments of the present invention also provide a method of estimating a friction coefficient between a tire and a road surface for a slow-rolling or stationary automotive. The method includes providing a brush model for a description of the steering torque across a contact patch between the automotive tire and road surface, measuring the wheel velocity, the steering rate and the steering torque, and estimating the friction coefficient based on the measurements of the steering torque and the brush model.

As used herein, the term "slow-rolling" means a wheel velocity not greater than 5 m/s, preferably a wheel velocity less than 2 m/s, more preferably less than 1 m/s.

For the case of a stationary vehicle, the steering torque depends on a tire brush vertical load distribution and relative motion of tire brushes and the road surface.

For the brush model of the present invention, the steering torque is determined across the contact patch by breaking up the contact patch into individual tread elements and integrating tire brush vertical load distribution over the contact patch, where the vertical load distribution and the relative motion of the tire brushes and the road surface each vary throughout the contact patch.

For the case of a slow-rolling vehicle, the brush model further comprises rolling relaxation dynamics of the tire, including determining positions of tire brushes and change of the tire brush vertical load distribution due to the rolling motion of the tire as the tire brushes enter or leave the contact patch such that tire brush vertical load distribution across the contact patch is updated at any given moment during a period.

BRIEF DESCRIPTION OF THE DRAWINGS

FIG. 7 is a plot showing an example of contact patch scrub torque distribution;

FIG. 8 is a plot showing another example of contact patch scrub torque distribution;

FIG. 10 is a photograph of an experimental drive-by-wire vehicle;

FIG. 11 is a schematic showing a left-side steering system and actuation of the experimental drive-by-wire vehicle;

FIG. 12 is a plot showing a time history of the steering angle input;

FIG. 13 is a plot showing a time history of the steering torque;

FIG. 14 is a plot showing the steering torque versus the steering angle;

FIG. 15 is two plots, the top plot showing a time history of the steering angle, the bottom plot showing a time history of the steering rate;

FIG. 20 is a plot showing steering angles along with FSM state for the period of experiment;

FIG. 21 is a plot showing friction results after running the estimator on simulated data from FIGS. 15 and 16;

FIG. 28 is a plot showing steering torques for fixed steering rate and varying vehicle velocity;

FIG. 29 is a plot showing steering torques for fixed vehicle velocity and varying steering rate;

FIG. 30 is a plot showing the steering data sets averaged and utilised as the input to the model to provide the model output;

FIG. 31 is a plot showing a comparison between the model and experimental data;

FIG. 35 is a plot showing steering torques for various friction coefficients and turn slip rates;

FIG. 36 is a plot showing numerically computed partial derivatives of T with respect to the friction coefficient at multiple friction values;

FIG. 37 is a plot showing a comparison of steering torque response between corn-covered asphalt and dry asphalt;

FIG. 38 is a plot showing experimental transient steering manoeuvres at a range of steering rates on corn-covered asphalt.

DETAILED DESCRIPTION OF THE EMBODIMENTS

The present invention provides a system and a method for estimating the deformation dynamics of a stationary or slowly rolling vehicle tire.

Slow-Rolling Tire Model

Figure 1:
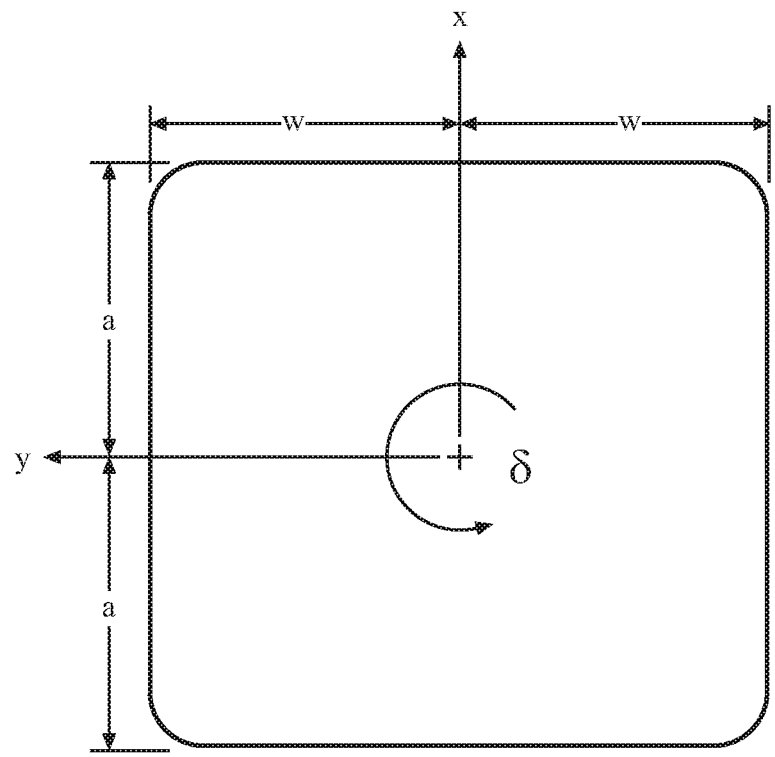
FIG. 1 is a schematic showing contact patch geometry and coordinates.

The dynamics of the slowly rolling tire are governed by three primary mechanisms: twisting, friction, and rolling. The steering of the tire causes a twisting of the rubber against the road surface. This twisting motion results in an elastic deformation of the rubber that is dependent upon the history of steering motion. The elastic deformation will grow with increasing steering as seen in FIG. 1, but is ultimately limited by the second mechanism, the friction condition between the rubber and road. After a certain amount of deformation, the friction force between the tread elements and the road will be exceeded by the restorative elastic force in the rubber and the tread element will slide, creating a saturation dynamic in the tread stress. These mechanisms exist whether the tire is rolling or stationary, making the third mechanism the key difference between the stationary and slow-rolling cases. This third mechanism is the relaxation of the tire rubber as a result of the relative motion of the tread elements in the contact patch, including the replacement of rubber at the leading edge of the contact patch and the rubber leaving the ground at the trailing edge of the contact patch.

Figure 2:
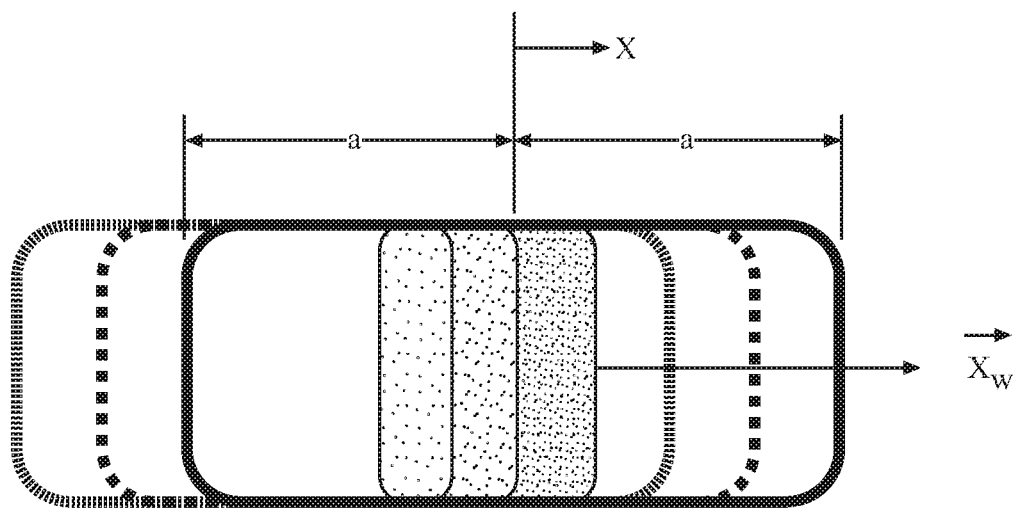
FIG. 2 is a schematic showing contact patch motion relative to tire tread brushes.

This rolling mechanism can be understood with a discretised example, as seen in FIG. 2, where the various strips of rubber in the contact patch are coded in grayscale with the position of the tire outlined in the same shade. In this example, the tire rolls through three positions. As it moves, the contact patch moves with the tire and the rear portion of the previous contact patch is lifted off the pavement. At the same time, a new unstressed section of rubber comes into contact at the front of the patch. Thus, the rubber at the front of the patch—with front being the direction of tire motion—is newly in contact and least stressed, while the rubber at the back of the patch has the longest time in contact and has the potential to be most stressed. The rate of stress relief is dependent upon the velocity of the wheel in the rolling direction, $\vec{x}_w$.

These three effects are combined through the use of a brush model. In contrast to the expressions developed for lateral tire force at an assumed steady-state, the rolling and twisting tire model presented in this work takes into account transient operation as well as stick-slip Coulomb friction behaviour. Together these effects result in a model that is nonlinear and hysteretic, making it difficult to obtain a practically useful closed-form solution for all operating regimes. Thus, the following subsections present a general discretised model which can be solved computationally.

Discretized Dynamics

Due to the complexity of the continuous dynamics, the tire behavior is considered here in discrete form, for which numerical evaluation techniques provide a straightforward solution. Three effects are described hereafter in the order in which they are handled in the numerical solution approach: rolling relaxation, saturation of brush stress, and then stress build-up from steering rate, as seen in Algorithm 1.

---

Algorithm 1: Numerically Solving Brush Stress of Slow-Rolling Tire Dynamics

---

Input: Vehicle velocity, steering rate
Output: Tire brush stress distribution and total scrub torque
Data: Vertical force distribution: $q_z$ (i, j) $\forall$ i,j, contact patch parameters a and w,
 brush stiffness, road friction limit and sliding values
Initialise the brush stress distribution to zero: $\tau$(i, j, k = 0) = 0 $\forall$ i, j
Initialise the total scrub torque to zero: T(k = 0) = 0
while k less than total iterations do
 Determine brush shift index, $n_s$, to lowest integer multiple;

---

Algorithm 1: Numerically Solving Brush Stress of Slow-Rolling
Tire Dynamics

---

```
for each lateral row of brushes, j, working back to front from -α to a do
    for each brush in the row, i, working left to right from -w to w do
        if brush stress is greater than friction limit at any between the start grid
        position and end grid position then
            Relax brush and store in brush position at k + 1
        else
            Transfer brush stress to brush position at k + 1
        end
    end
end
for each brush in the patch do
    Integrate brush deflection due to steering motion, ignoring friction;
    If Brush stress is greater than available static friction then
        Store sliding friction limit as brush stress
    else
        Store integrated brush stress value
    end
end
end
```

---

Vertical Loading

Figure 3:
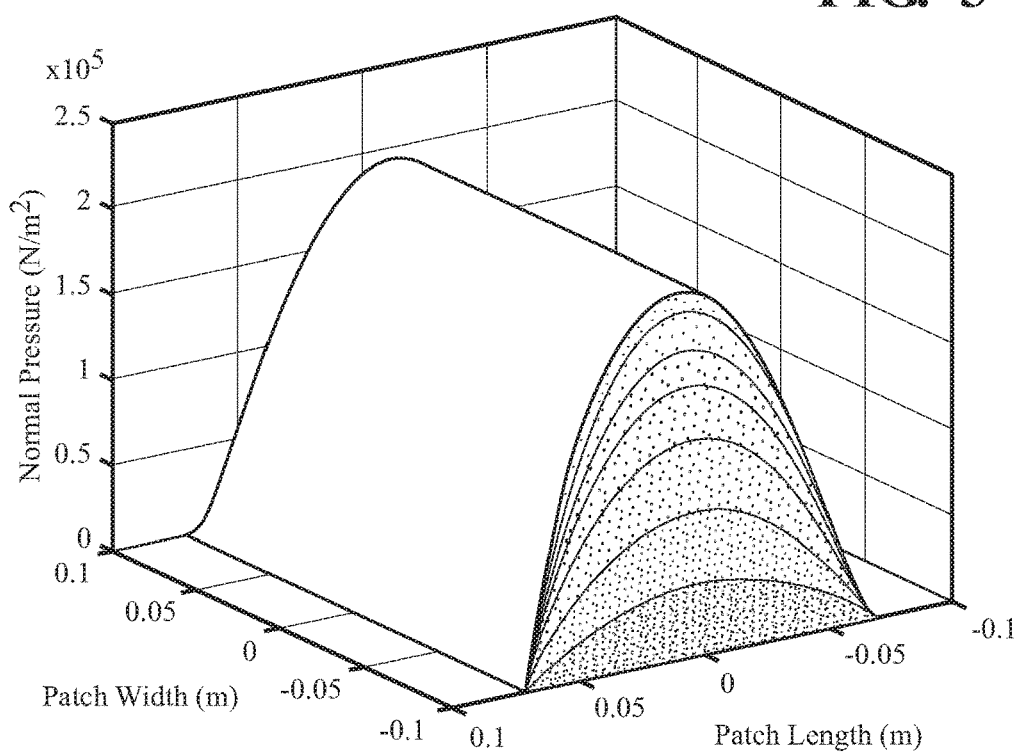
FIG. 3 is plot showing a parabolic longitudinal normal force distribution and a uniform model with tapered-off uniform distribution in lateral direction.

As illustrated in Algorithm 1, the friction limit at each location in the contact patch is a critical piece of information that must be known or estimated prior to utilising this model. In this work, the adhesive and sliding friction coefficients are assumed to be uniform throughout the contact patch. Therefore, any variation in the friction limit is a result of the vertical load distribution chosen. The simplest choice for the vertical load distribution is a uniform loading, which yields $$q_z(x, y) = \frac{F_z}{4wa} \tag{a1}$$

where $F_z$ is the total vertical load and $\alpha$ and $w$ are the half-length and half-width of the contact patch measured from the origin, $(x_0, y_0)$, located at the geometric centre of the contact patch as illustrated in FIG. 3. While this distribution is simple to work with mathematically, previous work by Shiobara et al. (H. Shiobara, T. Akasaka, S. Kagami, and S. Tsutsumi. One-Dimensional Contact Pressure Distribution of Radial Tires in Motion. *Tire Science and Technology*, 23(2):116-135, apr 1995.) showed that the loads at the tire edges, and to a smaller extent the centreline, are lower than in the intermediate spaces. Tsiotras et al. (P. Tsiotras, E. Velenis, and M. Sorine. A LuGre tire friction model with exact aggregate dynamics. *Vehicle System Dynamics*, 42(3): 195-201, 2004.) noted that a quartic vertical distribution provided a reasonable representation of experimental vertical load data in the longitudinal tire coordinate. For the following model development, a generic vertical load distribution, $q_z(x,y)$, is used to preserve the generality of the work. However, simulations of the model in the following sections use a quartic model of the normal load, which is represented generally as $$q_{zx}(x) = c_4 x^4 + c_3 x^3 + c_2 x^2 + c_1 x + c_0 \tag{a2a}$$

$$q_{zy}(y) = d_4 y^4 + d_3 y^3 + d_2 y^2 + d_1 y + d_0 \tag{a2b}$$

$$q_z(x, y) = q_{zx}(x) \cdot q_{zy}(y). \tag{a3}$$

where the $c_i$ and $d_i$ values are chosen to obtain a desired shape of the quartic distribution.

Boundary conditions are used to ensure that $q_{zx}$ and $q_{zy}$ equal zero at $-\alpha$, $\alpha$, $-w$, and $w$ and that $\int_{-w}^{w}\int_{-\alpha}^{\alpha} q_z(x,y)dxdy = F_z$. Several degrees of freedom remain open, and the remaining constraints on the coefficients $c_i$ and $d_i$ can be chosen to create a realistic vertical force distribution that matches experimental data. Examples of these constraints, as well as surface plots of several example vertical load distributions are provided in the present invention. In particular, this work utilises $$-\gamma \frac{dq_z(x)}{dx}\bigg|_{x=-a} = \frac{dq_z(x)}{dx}\bigg|_{x=a} \tag{a4}$$

with the quartic slope factor, $\gamma$, and $$vF_z = \int_{-a\chi_-}^{a\chi_+} q_z(x)dx = [c_4 \ c_3 \ c_2 \ c_1 \ c_0] \begin{bmatrix} \frac{(a\chi_+)^5 - (-a\chi_-)^5}{5} \\ \frac{(a\chi_+)^4 - (-a\chi_-)^4}{4} \\ \frac{(a\chi_+)^3 - (-a\chi_-)^3}{3} \\ \frac{(a\chi_+)^2 - (-a\chi_-)^2}{2} \\ ((a\chi_+) - (-a\chi_-)) \end{bmatrix} \tag{a5}$$

which specifies that some portion, $v$, of the total vertical load, $F_z$, must lie within a given portion of the patch, $[-\alpha\chi_-, \alpha\cdot x_+]$, where $\chi_- \in (0,1]$ and $\chi_+ \in (0,1]$.

Rolling Relaxation

With the vertical load defined, the rolling relaxation behaviour can be considered. This behaviour is caused by the rubber entering and then leaving the contact patch due to the motion of the tire. Thus, the motion of a brush in the contact path is primarily a translation along the distance that the tire rolls, with the vertical force applied to the brush changing as the brush moves through the contact patch. For the purposes of this work, the tire is assumed to roll freely without applied drive or braking torques. Hence the motion of the brush tip relative to the contact patch is the negative of the wheel velocity relative to the ground. At each step, k, the distance the tire rolls is calculated from $$d_{shift}^k = \omega_{wh}^k R_e \Delta_t = V_{wh} \Delta_t \qquad (b1)$$

where $\omega_{wh}$ is the rolling rate of the wheel, $R_e$ is the effective rolling radius of the wheel, $V_{wh}$ is the linear velocity of the wheel hub in the longitudinal direction of the wheel, and $\Delta_t$ is the sampling rate of the estimation algorithm. The discretised nature of the algorithm dictates that, for ease of calculation, the shift be an integer number of longitudinal grid spaces. This results in some round-off error in position that can accumulate, particularly for low-speed motion, if not carefully stored and considered in subsequent steps. Thus, $$n_{shift}^k = \frac{d_{shift}^k + d_{store}^k}{\delta_x} \qquad (b2)$$

$$d_{store}^{k+1} = d_{shift}^k - n_{shift}^k \delta_x \qquad (b3)$$

where $\delta_x$ is the grid spacing in the longitudinal direction of motion, $n_{shift}^k$ is the number of grid spaces that each brush shifts at time-step k, and $d_{store}^{k+1}$ is the unhandled shift distance that is accumulated into the next time step. There is error associated with both limiting the shift distance to integral number of grid spaces and handling the shift distance sequentially with the steering rate, but as the results that follow will show, these errors can be reduced to negligible amounts with suitably chosen discretisation intervals.

As the tire rolls, the amount of vertical load applied to each brush changes with its new position in the contact patch. For some brushes, the vertical load increases, and in the absence of additional steering motion, the stress in these brushes is assumed to remain constant and they are simply shifted to their new location in the contact patch. However, other brushes may experience a lowered vertical load at an intermediate location as the tire rolls, and thus their stress will be relaxed. As a result, the updated brush stress after rolling but before steering will be limited by the minimum available friction, $\mu_s q_{min}$, encountered by the brush during rolling, i.e.:

$$\tau(x^k - n_{shift}^k \delta_x, y^k) = \text{sgn}(\tau(x^k, y^k)) \min\left(|\tau(x^k, y^k)|, \frac{\mu q_{min}}{c_\tau}\right) \qquad (b4)$$

where $C_\tau$ is the brush force produced per unit brush deflection length, per unit contact area, $\mu$ is the adhesive coefficient of friction between the rubber and the road surface, and the lowest vertical load experienced by the brush during the relative motion is quantified by $$q_{min} = \min_\xi q_z(\xi, y), \forall \xi \in (x^k - n_{shift}^k \delta_x, x^k]. \qquad (b5)$$

where $q_z(x, y)$ is the vertical load distribution in the tire contact patch. Note that the travel distance is subtracted from $x^k$ due to the contact patch description in ISO wheel coordinates (ISO. Road Vehicles—Vehicle Dynamics and road-holding ability—Vocabulary. Technical Report 8855, International Organization for Standardization, 1991.), where x increases from the back of the contact patch to the front and thus the brush travel is in the negative x direction.

Steering Stress

Following the transferring and unloading effects of rolling, the brush deflection calculations are combined with the effect of the steering rate during the time step. The calculation of this brush deflection follows from the model for the stationary vehicle presented in the present invention. However, the assumption of a non-rolling wheel allowed for simplification of the rotational motion and torque calculations due to the constant rotational and moment arm about the centre of rotation. In this work, the description of the brush motion is calculated with the cross product of the steering rate and the location of the brush, yielding:

$$\frac{d\tau_b(x, y)}{dt} = C_\tau \begin{bmatrix} 0 \\ 0 \\ \dot{\delta}(t) \end{bmatrix} \times \begin{bmatrix} (x - x_c) \\ (y - y_c) \\ 0 \end{bmatrix}, \qquad (c1)$$

where $\dot{\delta}(t)$ is the steering rate, and $x_c$ and $y_c$ are the coordinates of the centre of rotation of the tire's contact patch.

However, this steering-induced brush stress is limited by the friction contact of the brush with the roadway surface. Namely, the brushes slip when $\|\tau_b(x,y)\| > \mu q_z(x, y)$. Thus, each brush in the contact patch may have impending slip in either direction, or be unsaturated. This results in regions of the contact patch belonging to one of the following sets, $$\Omega_{sat}(t) = \left\{(x, y) \mid \lim_{\xi \to t^-} \|\tau_b(x, y, \xi)\| \geq \mu q_z(x, y)\right\} \qquad (c2)$$

$$\Omega_{unsat}(t) = \left\{(x, y) \mid \lim_{\xi \to t^-} \|\tau_b(x, y, \xi)\| \leq \mu q_Z(x, y)\right\} \qquad (c3)$$

where the limit as $\xi \to t^-$ takes into account the rolling of brushes into new locations in the contact patch and the integration of the steering rate.

Once the regions are known, the brush stress distribution can be determined by saturating the friction-limited brushes and integrating the change in brush stress over the temporal dimension for the unsaturated brushes, $$\tau_b(x, y, t) = \qquad (c4)$$

$$\begin{cases} \mu_s q_z(x, y) \lim_{\xi \to t^-} \left\{\frac{\tau_b(x, y, \xi)}{\|\tau_b(x, y, \xi)\|}\right\} & \forall (x, y) \in \Omega_{sat}(t) \\ \tau_b(x, y, t - \Delta_t) + \int_{t-\Delta_t}^{t} \left\{\frac{d\tau_b(x, y)}{dt}\right\} dt & \forall (x, y) \in \Omega_{unsat}(t) \end{cases}$$

where $\mu_S$ is the sliding coefficient of friction between the tire and the road surface and it is assumed that $$R_\mu = \frac{\mu_s}{\mu} \leq 1.$$

Finally, the total contact patch scrub torque can be calculated by integrating over the spatial dimensions of the contact patch, $$T = \int_{-w}^{w}\int_{-a}^{a}\left\{\tau_b(x,y,t)\begin{bmatrix}0\\0\\1\end{bmatrix}\times\begin{bmatrix}(x-x_c)\\(y-y_c)\\0\end{bmatrix}\right\}dxdy. \quad (c5)$$

Stationary Tire Model

The origin of the patch, $(x_o, y_o)$, is assumed to be the geometric center of the patch, while the center of rotation is defined by the intersection of the steering kingpin axis and the ground at $(x_c, y_c)$. The steering angle, $\delta$, is taken to be a rotation in the z direction since the inclination angle of the kingpin axis is typically small.

The deflection of each brush is defined by the relative motion of the top of the brush, attached to the tire carcass, and the bottom of the brush, which interacts with the road. When the vehicle is assumed to be stationary, brush deflection is a function of only the steering motion and can be approximated by the arc length, s, traveled by the brush about the steering axis. Because the state of the brush evolves over time, the brush deflection dynamics are modeled with the differential equation that describes the deflection of the brush tip as a function of steering inputs and distance from the center of rotation on the contact patch, $$\frac{ds(x,y)}{dt} = \dot{\delta}(t)\sqrt{(x-x_c)^2 + (y-y_c)^2}. \quad (6)$$

The stress associated with the deflection can be determined using the brush stiffness of the tire. Hereafter this stiffness is represented by the constant $C_\tau$, which is the force produced per unit brush deflection length, per unit contact area. Thus, the shear stress as a result of displacement is $$\frac{d\tau_b(x,y)}{dt} = C_\tau\dot{\delta}(t)\sqrt{(x-x_c)^2 + (y-y_c)^2}. \quad (7)$$

However, this expression is not sufficient to fully describe the brush mechanics since Coulomb friction limits the grip of the brush on the road surface. Defining a vertical load per unit area as $q_z(x, y)$, the maximum friction force that can be developed per unit area is $\mu q_z(x, y)$, where $\mu$ is the maximum adhesive friction coefficient between the tire and road surface. Therefore, the brushes are grouped into sets, where the first is the set of brushes that are saturated in the positive direction, the second set is saturated in the negative direction, and a third set are unsaturated. These are determined by examining the brush stress value at a given moment in time, t, prior to any impending slip, $$\Omega_{sat(+)}(t) = \left\{(x,y)\,\middle|\,\lim_{t\to\xi^-}\tau_b(x,y,\xi) \geq \mu q_z(x,y)\right\} \quad (8)$$

$$\Omega_{sat(-)}(t) = \left\{(x,y)\,\middle|\,\lim_{t\to\xi^-}\tau_b(x,y,\xi) \leq -\mu q_z(x,y)\right\} \quad (9)$$

$$\Omega_{unsat}(t) = \left\{(x,y)\,\middle|\,\left|\lim_{t\to\xi^-}\tau_b(x,y,\xi)\right| \leq \mu q_a(x,y)\right\} \quad (10)$$

The stress state of individual brushes can be calculated by integrating the brush stress equation over time, noting that the sets of brushes reaching the peak friction stress will slip and be relieved of stress if the sliding friction coefficient is chosen less than the adhesive coefficient, $\mu_s \leq \mu$. This yields the time-dependent stress distribution equation, $$\tau_b(x,y,t) = \begin{cases}\mu_s q_z(x,y) & \forall\,(x,y)\in\Omega_{sat(+)}(t)\\ -\mu_s q_z(x,y) & \forall\,(x,y)\in\Omega_{sat(-)}(t)\\ \int_0^t C_\tau\dot{\delta}(t)\sqrt{(x-x_c)^2+(y-y_c)^2}\,dt & \forall\,(x,y)\in\Omega_{unsat}(t)\end{cases} \quad (11)$$

It is worth noting that $\tau_b(x, y, t)$ can reach values greater than $\mu_s q_z(x, y)$ prior to slipping, and with disparate friction coefficients, the brush stress will cycle as it builds up to the peak friction value and slips to relieve stress to the sliding friction value. It is assumed that this cycling occurs instantaneously if an individual brush is deflected beyond the maximum friction; in practice, this stick-slip behavior can produce audible vibrations in the tire and produce visible oscillations in the experimental data presented later.

Given the state of stress in each brush, the total torque developed around the steering axis can be calculated by integrating over the length and width of the contact patch, $$T = \int_{-w}^{w}\int_{-a}^{a}\left\{\tau_b(x,y,t)\sqrt{(x-x_c)^2+(y-y_c)^2}\right\}dxdy \quad (12)$$

where $x_c$ and $y_c$ are the longitudinal and lateral coordinates of the center of rotation of the contact patch, respectively, and w and $\alpha$ are the half-width and half-length of the contact patch, respectively. In one example, numerical integration for the model was performed using the trapezoidal method with lateral and longitudinal grid spacing of 2 mm. A convergence study verified the assumption that results were unchanged at smaller grid spacings.

Vertical Load Modeling

So far, a complete model of the tire steering scrub torque is provided. However, this torque depends on the distribution of normal force within the tire's contact patch, $q_z(x, y)$, for which a definition was given above without an expression in terms of other known parameters. The vertical load on a tire has been studied by researchers and a number of different pressure distributions have been proposed as approximations to the real tire behavior. These include a uniform distribution, parabolic, or a quartic distribution. Each of these distributions are defined along a single direction, and any pair can be used in combination for the lateral and longitudinal directions. In the present invention, the combined distribution is obtained by specifying distributions in the longitudinal direction, $q_{zx}(x)$, and the lateral direction, $q_{zy}(y)$, and multiplying to yield the complete normal load distribution:

$$q_z(x,y) = q_{zx}(x)\cdot q_{zy}(y) \quad (13)$$

In order to create a physically realistic pressure distribution, regardless of assumed form, the following condition must hold:

$$F_z = \int_{-a}^{a}\int_{-w}^{w}q_z(x,y)dydx \quad (14)$$

where $F_z$ is the total vertical force on the wheel. While there are a number of ways of developing the $q_{zx}(x)$ and $q_{zy}(y)$ terms such that they satisfy equation (14), the following constraints were used to guarantee adherence to the total force constraint:

$$F_z = \int_{-a}^{a} q_{zx}(x)dx, \ 1 = \int_{-w}^{w} q_{zy}(y)dy \tag{15}$$

These separate constraints ensure that the product $q_{zx}(x) \cdot q_{zy}(y)$ satisfies equation (14). Other constraints are added as needed for the specific pressure distributions.

1. Uniform Load Distribution

The uniform load distribution assumes an equal pressure across the specified dimension of the contact patch, either lateral or longitudinal. Since the magnitude of the distributed vertical force is the only parameter determining the distribution, the constraints in equation (15) are sufficient to fully define this distribution as $$q_{zx}(x) = \frac{F_Z}{2a} \text{ or } q_{zy}(y) = \frac{1}{2w} \tag{16}$$

A slight modification to this distribution is to use a nearly uniform distribution but smoothly roll off the edges to zero normal force at the edges of the contact patch. Many algebraic forms could be used for this, including making the distribution piecewise:

$$q_{zx}(x) = \begin{cases} \frac{p_0}{\gamma}(x+a) & \text{for } x \in [-a, -a+\gamma] \\ p_0 & \text{for } x \in [-a+\gamma, a-\gamma] \\ \frac{-p_0}{\gamma}(x-a) & \text{for } x \in (a-\gamma, a] \end{cases} \tag{17}$$

$$q_{zy}(y) = \begin{cases} \frac{p_0}{\gamma}(y+w) & \text{for } y \in [-w, -w+\gamma] \\ p_0 & \text{for } y \in [-w+\gamma, w-\gamma] \\ \frac{-p_0}{\gamma}(y-w) & \text{for } y \in (w-\gamma, w] \end{cases} \tag{18}$$

where $\gamma$ is the roll-off distance at each edge and $p_0$ is the magnitude of the uniform portion between the edges. $p_0$ will be larger in magnitude than $$\frac{F_z}{2a} \text{ or } \frac{1}{2w},$$

depending on the distribution direction.

2. Parabolic Load Distribution

The parabolic load distribution assumes a symmetric parabola with the peak at the center of the tire contact patch. The parabolic distribution has three parameters to define, with a general form of $$q_{zx}(x) = c_2 x^2 + c_1 x + c_0 \tag{19}$$

$$q_{zy}(y) = c_2 y^2 + c_1 y + c_0 \tag{20}$$

A typical formulation of the parabolic distribution assumes the contact pressures at the endpoints of the contact patch to be zero, $$q_z(-a) = 0 \tag{21}$$

$$q_z(a) = 0 \tag{22}$$

though other values could also be utilized. In combination with equation (15), these constraints fully define the distribution as:

$$q_{zx}(x) = \frac{3F_z}{4}\left(\frac{a^2-x^2}{a^3}\right) \text{ or } q_{zy}(y) = \frac{3}{4}\left(\frac{w^2-y^2}{w^3}\right) \tag{23}$$

3. Quartic Load Distribution

The quartic load distribution requires a mathematical definition that is significantly more complex than other load distributions. However, experimental pressure distributions demonstrate profiles that cannot be matched by the uniform or parabolic distributions. The quartic distribution, in contrast to the other previous options, is defined by five parameters with a general form of $$q_{zx}(x) = c_4 x^4 + c_3 x^3 + c_2 x^2 + c_1 x + c_0 \tag{24}$$

$$q_{zy}(y) = c_4 y^4 + c_3 y^3 + c_2 y^2 + c_1 y + c_0 \tag{25}$$

Like the parabolic distribution, the endpoints of the contact patch are assumed to have zero normal force, yielding two additional constraints, $$q_z(-a) = 0 \tag{26}$$

$$q_z(a) = 0 \tag{27}$$

Applying these boundary conditions leaves two degrees of freedom. For the remaining degrees of freedom, there are numerous choices.

One useful expression is the slope of the normal force curve, which can be used to influence the shape of the distribution:

$$\frac{dq_z(x)}{dx} = 4c_4 x^3 + 3c_3 x^2 + 2c_2 x + c_1. \tag{28}$$

Thus, the slope can be specified at the endpoints $x=-\alpha$ and $x=\alpha$. Another use of the slope expression is to use a multiplicative factor, $\gamma$, to force a relationship between the leading edge slope and trailing edge slope.

$$-\gamma \frac{dq_z(x)}{dx}\bigg|_{x=-a} = \frac{dq_z(x)}{dx}\bigg|_{x=a} \tag{29}$$

$$4c_4 a^3(1-\gamma) + 3c_3 a^2(1+\gamma) + 2c_2 a(1-\gamma) + c_1(1+\gamma) = 0 \tag{30}$$

$$\int_{-a\chi_-}^{a\chi_+} q_z(x)dx = \begin{bmatrix} c_4 & c_3 & c_2 & c_1 & c_0 \end{bmatrix} \begin{bmatrix} \left(\frac{(a\chi_+)^5 - (-a\chi_-)^5}{5}\right) \\ \left(\frac{(a\chi_+)^4 - (-a\chi_-)^4}{4}\right) \\ \left(\frac{(a\chi_+)^3 - (-a\chi_-)^3}{3}\right) \\ \left(\frac{(a\chi_+)^2 - (-a\chi_-)^2}{2}\right) \\ (a\chi_+) - (-a\chi_-) \end{bmatrix} \quad (31)$$

Another constraint that is useful for shaping the distribution is a central load constraint, which specifies that some portion, v, of the total vertical load, $F_z$, must lie within a given portion of the patch, $[-\alpha \cdot \chi_-, \alpha \cdot \chi_+]$, where $\chi_- \in (0,1]$ and $x_+ \in (0,1]$. This results in the expression which can be used in combination with the other constraints above to constrain the remaining degrees of freedom in the distribution. The final form of equation (28) also can be used for the lateral direction, taking into account the different values for the various $c_i$ constants.

4. Combined Distributions

To obtain a complete distribution over the entire area of the contact patch, a pair of distributions are chosen for the lateral and longitudinal directions and the product, $q_{zx}(x)q_{zy}(y)$, yields the result, $q_z(x, y)$. For example, assuming a quartic longitudinal, uniform lateral combination yields $$q_z(x, y) = \frac{1}{2w}(c_4 x^4 + c_3 x^3 + c_2 x^2 + c_1 x + c_0). \quad (32)$$

Figure 4:
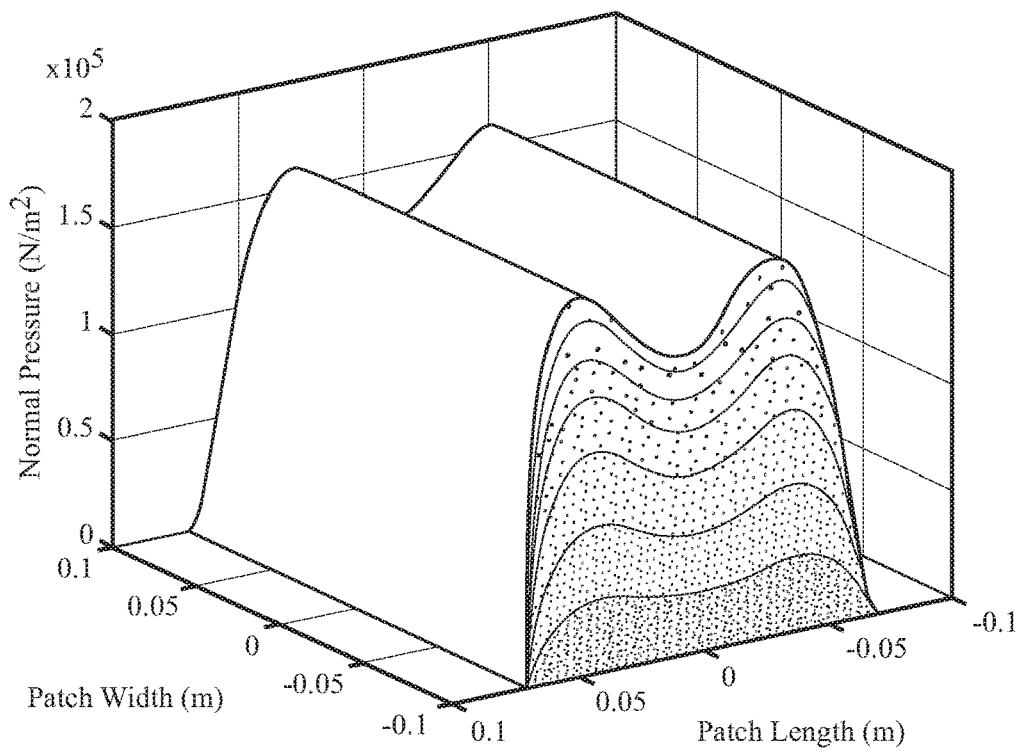
FIG. 4 is a plot showing a quartic longitudinal normal force distribution and a uniform model with tapered-off uniform distribution in lateral direction.

Two more combined distributions are shown in FIGS. 3 and 4. FIG. 3 illustrates a distribution with a parabolic form in the longitudinal direction and a uniform form with tapered-off edges in the lateral direction. Similarly, FIG. 4 shows the result for a combination of quartic longitudinal and tapered uniform lateral forms.

5. Distributed Moments

Figure 5:
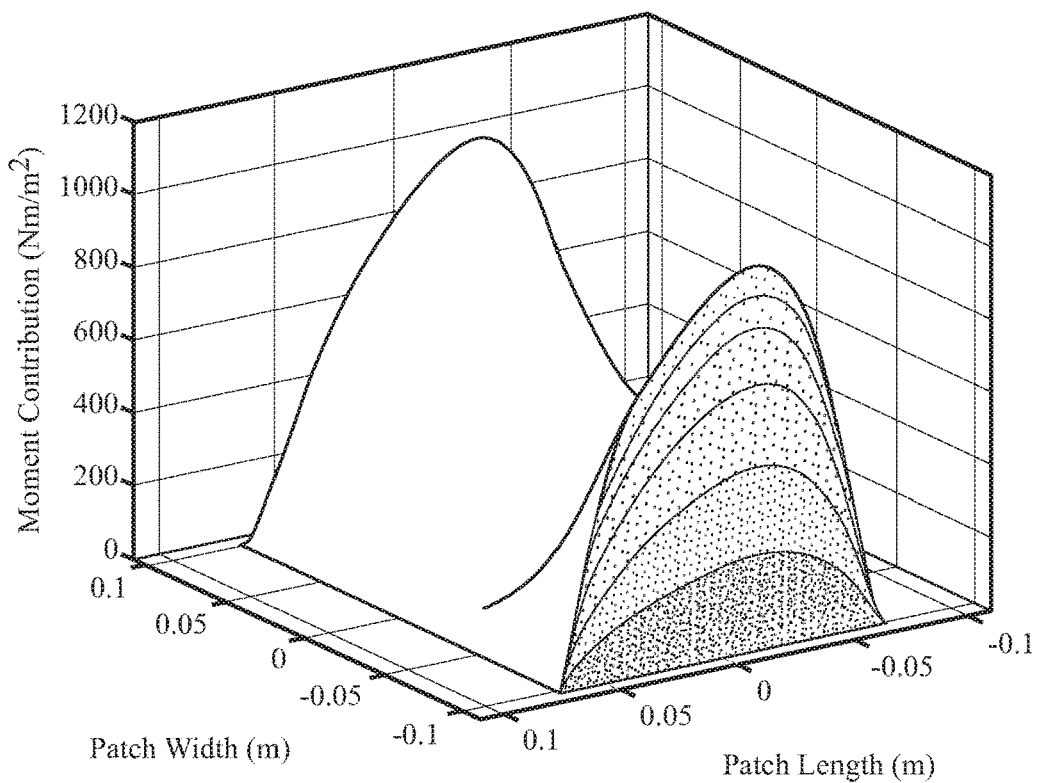
FIG. 5 is a plot showing contribution of contact patch elements to total scrub torque with a parabolic longitudinal normal force distribution and a uniform model with tapered-off uniform lateral distribution.
Figure 6:
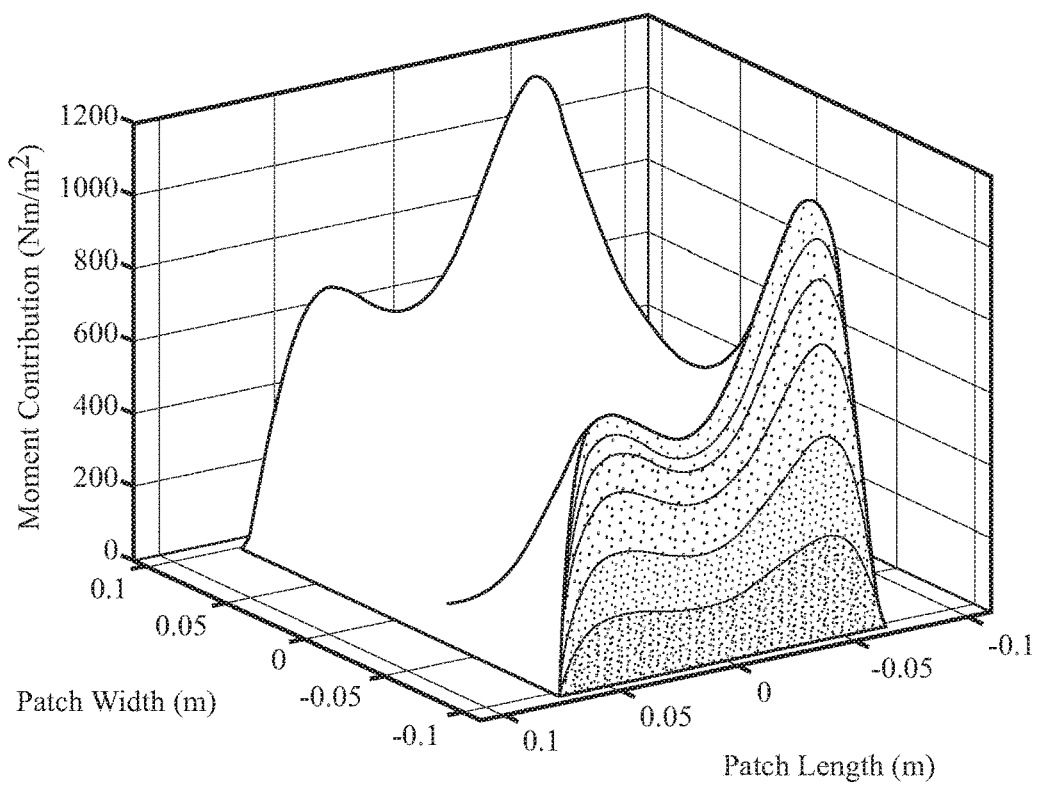
FIG. 6 is a plot showing contribution of contact patch elements to total scrub torque with a quartic longitudinal normal force distribution and a uniform model with tapered-off uniform lateral distribution.

The various portions of the contact patch result in significantly different contributions to the total moment, depending on the normal force distribution and the distance from the center of rotation. FIGS. 5 and 6 illustrate the moment contributions for vertical load distributions with parabolic and quartic shapes in the longitudinal direction respectively and a uniform shape with rolled-off edges in the lateral direction.

The plot illustrates that largest amount of steering scrub torque comes from the inboard and outboard edges of the contact patch. This is due to a combination of the geometry—these edges are farthest from the center of rotation and thus have the largest deformations and moment arms—and the normal load, which is large through most of the contact patch except for the leading and trailing edges. The exact shape of the surface will vary with the contact patch length and width and the assumed normal distribution, but the general trends will remain the same.

Stationary Tire Model Validation

A series of experiments were conducted in order to validate the analytical model presented in the previous section. In these experiments, the P1 steer-by-wire vehicle, shown in FIG. 10, was used to collect data as the front vehicle wheels were swept between the left and right limits while parked on a hard concrete surface (note: additional surface tests are presented later in the present application). During some of the sweeps, a small "dither" angle was added on top of the sweep angle, as seen in FIG. 12, to reduce the impact of steering gear friction and identify hysteretic behavior in the system.

Instrumentation

The data collected include the steering angles and tire forces. Since the P1 vehicle has independent left and right steering systems, the steering angles are recorded from encoders on the steering servomotors. These encoders have a resolution of 0.00225 degrees per tick at the output of the steering gearbox. The gearbox angle is transformed through the steering linkage kinematics to obtain the roadwheel angle. Backlash and compliances in the linkage are likely present, but equipment has not been available to quantify these effects. As a result, they are neglected in the model but observed effects are noted in the discussion of the experimental results. The architecture of the system is illustrated in FIG. 11.

The wheel forces and torques are measured in 3 ways: first, full 6DOF force/moment measurements are available from each tire using a pair of Michigan Scientific LW9.5 wheel force transducers. These sensors have an accuracy rating of 5 N vertical force and 7 Nm aligning moment. A secondary moment measurement is provided by a pair of Transducer Techniques DSM-1K axial load cells installed in the steering tie rods. These load cells have a maximum load capacity of 1000 N with a post-calibration accuracy of less than 2 N. Finally, the third source of steering moments is from the two by-wire steering actuators on this vehicle, which utilize a pair of DC permanent magnet servomotors coupled to harmonic drives with 160:1 reduction ratios. These servo mechanisms each individually actuate one of the front tires and could also be used to estimate the steering torque by incorporating the current feedback sensor of the motor amplifiers. The three sources of tire force/moment data represent a wide range of possible data sources: 1) a research-grade instrumented vehicle, 2) a production-capable sensing system but one not conventional for current production vehicles, and 3) a production-like steer-by-wire system. Using the kinematics of the steering system and subtracting jacking torque effects, the second and third sensor measurements can be used to provide a lower cost measurement of the scrub torques generated by steering. All forces and torques, along with the steering angles, were recorded at 500 samples/second. Constant velocity operation was enabled by creating a PID feedback loop using the electric drive motors and the encoders, with resolution of 0.17°, provided by the wheel force transducers. Constant steering rates were created with a similar PID feedback loop incorporating the steering servo motors and the associated encoders which provide a resolution of 0.00225° at the road wheels.

Model Parameterization

The brush tire model depends on several key factors, most of which can be measured physically. Specifically, the normal force on the tire, Fz, was obtained using the wheel force transducer, though this value could be obtained easily from a priori static scale measurements or dynamic measurements of chassis behavior. The patch geometry parameters were measured by inserting a thin metal sheet underneath each edge of the tires until the point of contact with the pavement, and measuring the distance between the near edges of the metal sheets to obtain the longitudinal measurement 2a and the lateral measurement 2w. Any error associated with thin sheet measurements is expected to overestimate the patch size, as the sheets' entry into the contact zone would be blocked just outside the actual point of contact due to the sheet's thickness. This methodology was confirmed by making a tire imprint with carbon transfer paper, which yielded a patch measurement approximately 6% smaller in the lateral direction and approximately 2% in the longitudinal direction. The transfer paper measurements are expected to underestimate the actual contact patch, as a minimum pressure is needed for an imprint; the imprint will thus be slightly smaller than the actual contact zone. The agreement between different methods gives confidence that the measurements of contact patch are accurate to within a few percent.

The kingpin axis intersection with the tire patch, given by xc and yc, was obtained from the vehicle's suspension design by projecting the kingpin axis, as defined by the ball joint locations, to the tire patch area. In an embodiment of the present invention, the kingpin inclination angle was assumed to be sufficiently small such that rotations about the kingpin axis produce tire brush deformations that are approximately equivalent to those resulting from a rotation about a vertical axis. The justification for this assumption is that the work is performed with the vehicle at zero speed and thus the suspension is at ride height, at which it is generally designed to keep the tires in relatively at contact with the ground to improve handling and reduce tire wear. A known condition for the test vehicle where this assumption breaks down is at the extremes of the steering lock, where there is a moderate camber change that can be observed in the component force measurements from the wheel force transducers. To avoid erroneous friction measurements, the use of the algorithm can simply be prevented at these extreme points in the steering range.

For the tire deformation parameters, the brush stiffness was t to match the slope between the steering angle and steering torque. A quartic vertical load distribution was utilized, as described in the following section. Finally, the adhesion and sliding friction values, and s, were t to match the peak and saturation values of the measured torque curves for each steering sweep. Trapezoidal numerical integration techniques were utilized to integrate the spatial forces caused by brush dynamics in time, thus enabling prediction of the contact patch torque along the length and width. Parameters for the model are provided in Table 1, omitting only the friction coefficients $\mu$ and $\mu_s$ which varied between surfaces.

TABLE 1

Tire scrub model parameters

| Parameter | Symbol | Value |
|---|---|---|
| Patch half-length | a | 70 mm |
| Patch half-width | w | 101 mm |
| Tire vertical load | $F_z$ | 3600 N |
| Brush stiffness | $C_r$ | 3.5e7 ^-1^2 |
| Center of rotation (x) | $x_c$ | 30 mm |
| Center of rotation (y) | $y_c$ | 0 mm |
| Grid spacing (x) | $d_x$ | 2 mm |
| Grid spacing (y) | $d_y$ | 2 mm |
| Quartic slope factor | $\gamma$ | 1.0 |
| Central load fraction | $\chi_{+,-}$ | 0.77 |
| Central load factor | v | 0.86 |

Model Match

To illustrate the data and model fits, FIGS. 12-14 provide the experimental data and model fit for the clean concrete surface. FIG. 12 illustrates the left front steering angle time history resulting from the programmed steering maneuver, as measured at the steering gearbox output. In FIG. 13, the left front steering torque measured from the wheel force transducer is plotted against time for comparison to the time history of the steering angle. Finally, FIG. 14 offers a plot of the steering torque against steering angle to illustrate hysteretic effects.

FIGS. 12 and 13 provide an overview of the entire maneuver from which several features of the model match are visible. As shown in FIG. 12, from 10 to 20 seconds the steering input is solely a sine wave at a frequency of 0.05 Hz and an amplitude of 15 degrees, and within this window only the first half-cycle of that sine wave is completed. The amplitude was chosen to utilize most of the steering angle range, which is limited to 25 degrees for this vehicle, while leaving some additional steering margin for the later addition of dither. From 20 seconds to 40 seconds, the original 0.05 Hz sine wave is added with a second sine wave of amplitude 0.5 degrees at 1 Hz. The 0.5 degree amplitude was chosen since it is small enough not to saturate the brushes on each steering rate reversal. The higher frequency was chosen to provide several cycles of dither from which to observe the localized stress cycling of the brushes. Finally, after 30 seconds the dithering sinusoidal amplitude was increased from 0.5 degrees to a much larger 3 degree dither, maintaining a frequency of 1 Hz. This dither is sufficiently large that it saturates the brushes on each steering rate reversal and the friction saturation is seen in each direction as the maneuver is completed. It is important to note that the tire forces, apart from the time history of the localized deflection, do not have dynamics; the tire's force behavior is algebraic once the brush deflection history is known. Thus, the frequencies chosen here were for illustration and not to achieve a particular frequency-based persistence of excitation, as would be required for identifying a dynamic rather than algebraic tire model.

The results of these steering inputs on the tire stresses are seen in FIG. 13. From approximately 10-20 s, the brush stresses monotonically increase to the point of saturation. This process is reflected in the scrub as the torque increases to approximately 110 Nm and then levels off in a noisy band where the stick-slip behavior of the individual treads leads to variation in the total grip at each time step. The process repeats with a reversal of the steering rate, increasing monotonically as the brush stress is first relieved and then built-up to a noisy saturation in the negative direction. After 20 seconds, when the smaller amplitude dither sine wave is added, it is possible to see the brushes being relaxed and then re-stressed in the positive direction during the period from 20-30 s. After 30 seconds, the steering torques are clearly saturating due to the larger amplitude dither. When comparing the data to the measured steering torque, there is some overshoot of the model on a few of the cycles, but the overall agreement of the model amplitude and trends is good throughout this complex steering maneuver.

The data from the maneuver are also plotted in FIG. 14, with the final half-cycle omitted to reduce congestion. From this plot, it is possible to see several characteristic features of the system hysteresis loop. First, the magnitude of the upper and lower bands is a result of the friction between the tire and the ground; the measured magnitude matches the model-predicted saturation bands observed in the time-series plot. The slope of the transitions between the torque limits is a function of the brush stiffness. The model value of brush stiffness was manually tuned such that these slopes would match since the development of an analytical value of the stiffness of the tire brushes—inclusive of the composite tire layup—was impractical and unnecessary for this work.

Finally, an overshoot is seen on each of the dither cycles. Inclusion of separate adhesive and sliding friction coefficients, $\mu$ and $\mu_s$, with appropriate conditions for the brush to transition between the two states, allows the model to represent these torque peaks. This same mechanism is also partially responsible for the noisy saturation band as small portions of the contact patch cycle between sticking and sliding as the tire is steered. These small-scale effects could be captured with a more complex model, yet this would yield little value in support of the friction estimation objective.

Other aspects of the tire torque-angle data that are not captured by the model are the hysteretic effects of the steering linkage. As noted in a previous section, expensive testing and highly specialized equipment would be required to obtain the complete characterization of the backlash and compliances of the steering system. As a result, the model is implemented without these effects. The mismatch can be seen in two aspects of FIG. 14. The first is in the width of the dither "spikes", where the data shows a significant steering angle difference between the positive-going and negative-going portion of the signal. This is likely a result of backlash in the linkage between the sensor and the tire. As a result, the tire appears to have experienced a significant rotation but likely has moved little while the motor has rotated far enough to pass through the backlash band in the system and apply torque in the opposing direction. The other effect seen is a small offset with a short curving transition seen as the torque applied to the tire transitions between positive and negative values. At the extreme negative-to-positive transition on the left of the plot the transition occurs at about −20 Nm. The torque at which this transition occurs follows a relatively linear increase in magnitude to approximately −70 Nm at the positive-to-negative transition on the extreme right of the plot. This effect is likely a result of bushing compliances that are relaxed and then re-stressed as the torque is reversed. The offset from zero is likely the effect of a small angular offset in the orientation of the wheel force transducer that varies slightly due to the suspension and steering kinematics as the wheel angle is varied. Fortunately, these mechanisms have very little effect on the portions of the data utilized for the friction estimation approach described in the following sections, since the friction estimation approach presented later utilizes data from only the fully saturated regime.

Vertical Load Effects

Figure 16:
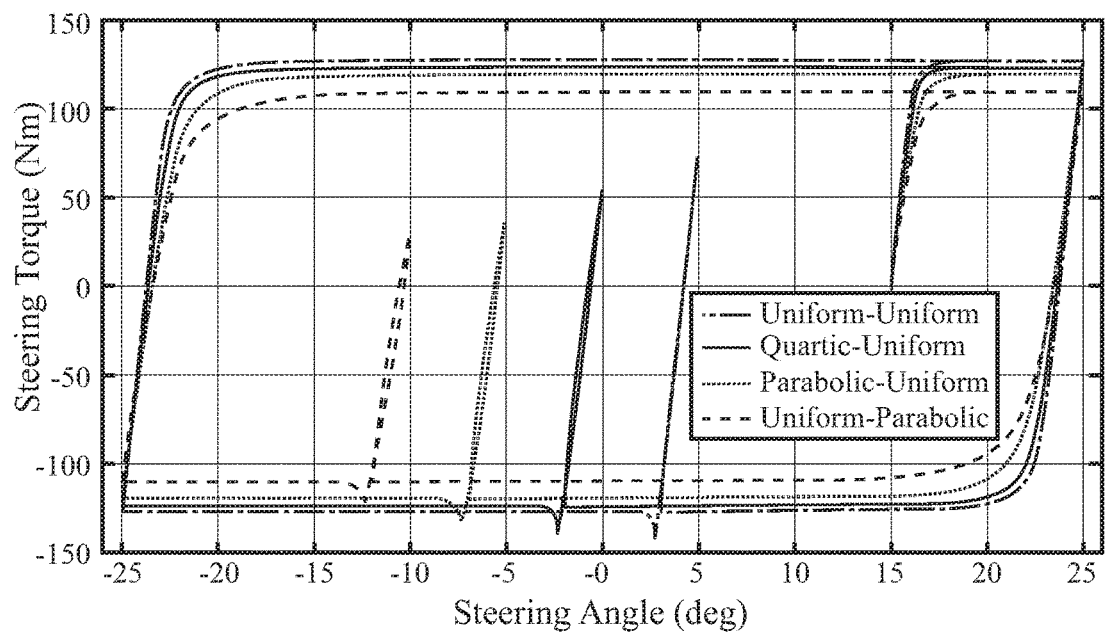
FIG. 16 is a plot showing the steering torque response to the steering angle input.

The choice of vertical load distribution also affects the model match. The wheel force transducers available on the P1 experimental vehicle provide a total vertical load on the tire, but do not provide information about the distributed force through the contact patch. Therefore, this work presents an analysis of four different vertical force distributions, including a quartic distribution in matching an experimentally-obtained normal force plot. FIGS. 15 and 16 illustrate the effects of varying load distribution on the torque-angle relationship, using the steering input sequence shown in FIG. 15.

The first subplot illustrates the response of the model with an assumed uniform pressure distribution in both longitudinal and lateral directions. This version of the model results in the largest torque values and the steepest slopes in the transition between the two steering directions. This is a result of having the largest amount of vertical force at the largest radii from the center of rotation. Similarly, the second subplot illustrates the results when using a quartic distribution along the length of the contact patch and a uniform distribution across the width of the patch. Very slight differences are noted between this formulation and the uniform-uniform model since only a small amount of area on the leading and trailing edges have significantly reduced normal load. The result is slightly lower torques and less sharp transitions between the torques associated with each motion direction.

Another commonly assumed pressure distribution takes on a parabolic form. The third subplot illustrates the results when the model is formulated with a parabolic longitudinal and uniform lateral distribution. Similarly to the quartic-uniform results, the maximum torque magnitudes are reduced and the transitions between the peak torques are more gradual as a result of the smaller normal forces at large radii. Finally, the fourth subplot illustrates the results when the distributions are reversed and the parabolic distribution is used in the lateral direction while the uniform distribution is used in the longitudinal direction. The results are similar to the previous case but more pronounced as the contact patch for this tire and total vertical load is wider than it is long, $w > \alpha$.

Because the maximum torque value is affected by the friction coefficient as well as the normal load distribution, it is not possible to utilize the upper and lower torque bands in the experimental data alone to determine the best choice of vertical load distribution. Instead, the distribution was chosen in tandem with the estimated friction coefficient so as to match both the transition shapes and the maximum torque values, as seen in FIG. 14. In particular, it was noted that the experimental data shows relatively sharp transitions between the maximum torque values at large steering angles. Only the quartic and uniform distributions yield these sharp transitions. Again, the quartic distribution was chosen for the longitudinal direction and the uniform distribution was chosen for the lateral direction. These distributions are utilized for the remainder of the present application.

Stationary Tire Model-Based Friction Estimation

While the previous section demonstrated that the model provides a good representation of the steering scrub torque, the complexity of this model precludes a direct inversion approach to friction estimation, as was done to estimate friction coefficient from aligning moment. Fortunately, the complexity in the model is mainly a result of the variation across the geometry of the contact patch and the dependence on the time-history of the tire motion. Examining the model behavior, it is possible to identify conditions at which the model reduces to a simpler form that is possible to invert for estimation purposes.

Theoretical Saturation Conditions

The simplification which has the most significant impact on the model is to divide the steering angle input into periods of piece-wise monotonic steering rate. The implication of this assumption is that the brush stresses build up to saturation limited by a friction approximately equal to the sliding friction, $\mu_s$, if there has been a sufficient change in the steering angle. This assumption has some error, as there may be some regions of the contact patch that have slipped and re-adhered, thus building up stress limited by the adhesive properties of the materials and resulting in an actual friction value slightly higher than that assumed here. However, since this effect is difficult to predict in detail due to its distribution through the contact patch and interaction with heterogeneous road surface conditions, the model takes into account only the assumed sliding friction, yielding $$\lim_{t\to\infty}(|\tau_b(x, y, t)|) = \mu_s q_z(x, y) \text{ provided } \dot{\delta}(t) > 0 \forall t \text{ or } \dot{\delta}(t) < 0 \forall t \quad (33)$$

and thus the estimate of the friction coefficient, $\mu_{est}$, can be calculated with the equation $$\mu_{est} = \frac{|T|}{\int_{-w}^{w}\int_{-a}^{a}\{q_z(x, y)\sqrt{(x - x_c)^2 + (y - y_c)^2}\}dxdy} \quad (34)$$

$$\delta_{rev} = \int_0^t \dot{\delta}(t)dt \geq \max_{\substack{-a \leq x \leq a \\ -w \leq y \leq w}}\left(\frac{2\mu q_z(x, y)}{C_T\sqrt{(x - x_c)^2 + (y - y_c)^2}}\right) \quad (35)$$

which is the minimum steering angle required for all of the elements in the contact patch to be in the saturated condition regardless of initial state. It is worth noting that the factor of two in the numerator of Eq. (35) makes this a conservative criterion as it assumes that all of the brushes are saturated in one direction and the tire must be steered far enough to completely relieve any residual stresses from prior maneuvers and then build up to saturation in the opposite direction. The friction term, in Eq. (35) is chosen to be the maximum possible value of the estimated friction coefficient to ensure sufficient excitation on all surfaces.

It is also worth noting that the complexity of the estimation process in Eq. (34) is almost entirely due to the area integral within the denominator; this integral does not depend on either time or the torque measurement. For a typical tire, which in normal operation has a quasi-static contact area and contact force pro le, this integral reduces to a constant, one that can be calculated offline or even factory-calibrated. Assuming that this computation was done offline, the resulting estimator's computational load is to perform one floating point division operation per each torque measurement. Even for low-cost embedded systems, the estimator computation should be feasible at microsecond intervals or faster, which is 3 orders of magnitude less than typical data-acquisition intervals on a vehicle, which are on the order of 1 millisecond or slower.

Practical Saturation Conditions

Figure 17:
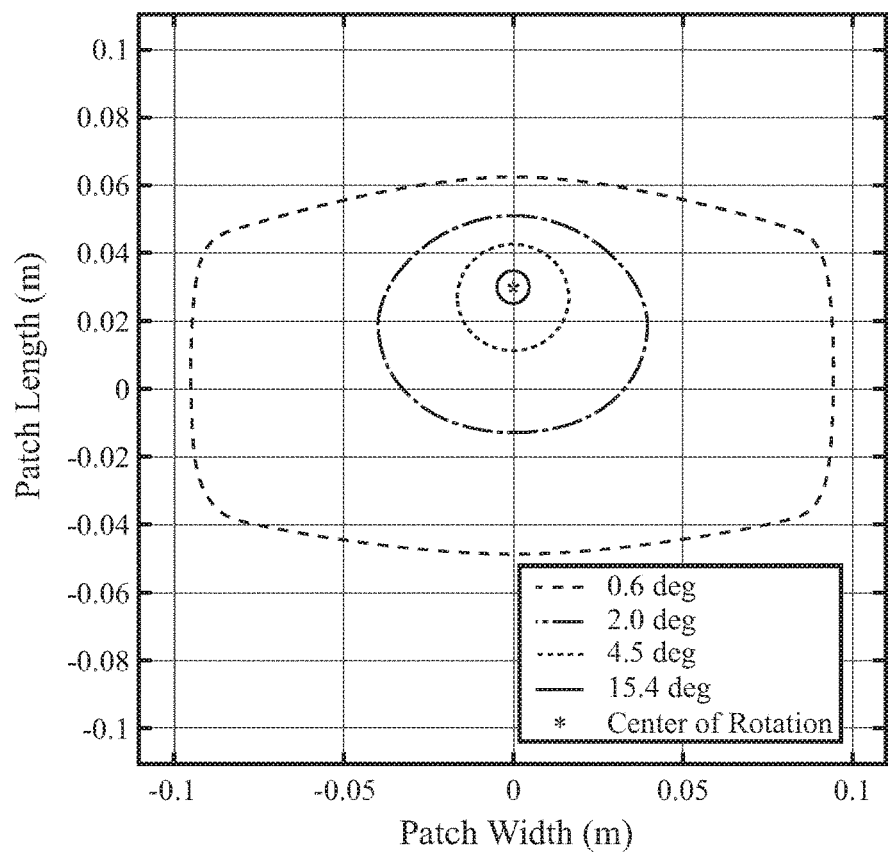
FIG. 17 is a plot showing contours for brushes reaching 95% of complete saturation for various steering angles. Brushes unsaturated inside each contour.

In addition to being conservative, Eq. (35) ends up being impractical for use, as at $x=x_c$ and $y=y_c$, the maximum on the right-hand side of the equation is infinite since the distance from the center of rotation is zero. Fortunately, this is also the location in the contact patch where the smallest contribution to the steering torque is made, as seen in FIGS. 5 and 6. Therefore, it is reasonable to exclude a portion of the contact patch surrounding the center of rotation when determining the minimum steering change required to saturate the majority of the contact patch. Thus, the modified minimum steering angle expression is $$\delta_{rev} = \int_0^t \dot{\delta}(t)dt \geq \max_{\{x,y\}|r_c(x,y)>R}\left(\frac{2\mu q_z(x, y)}{C_T\sqrt{(x - x_c)^2 + (y - y_c)^2}}\right) \quad (36)$$

where $r_c(x, y)=\sqrt{(x-x_c)^2+(y-y_c)^2}$ and R is a small radius surrounding the center of rotation for which the steering torque contributions are expected to be small relative to the contact patch total, and thus can be ignored. For perspective, FIG. 17 illustrates the boundaries of the regions where the brushes are stressed to at least 95% of the saturated value. These contours take on different shapes, depending on the assumed normal force distribution and steering axis location, but as the steering angle increases, the unsaturated region rapidly shrinks and takes on an increasingly circular shape. This provides evidence that Eq. (36) offers a reasonable estimate of the steering angle at which the majority of the steering torque is generated by saturated brushes. Note that Eq. (36) still includes the conservative factor of two in the numerator to ensure saturation, but the exclusion of the center portion of the results in practically realizable steering angles.

The friction estimation uncertainty associated with this choice can be bounded as $$\Delta\mu = \frac{\iint_{\{x,y\}|r_c(x,y)<R}\{\mu q_z(x, y)\sqrt{(x - x_o)^2 + (y - y_o)^2}\,dxdy\}}{\iint_{\substack{-a \leq x \leq a \\ -w \leq y \leq w}}\{\mu q_z(x, y)\sqrt{(x - x_o)^2 + (y - y_o)^2}\,dxdy\}} \quad (37)$$

where the numerator represents the deviation in the torque as a result of the elements within the radius R being assumed to generate zero torque and the denominator is the friction torque assuming all brush elements are saturated. The friction coefficient appears in both numerator and denominator and is assumed not to be a function of position within the contact patch. Therefore, the friction uncertainty is based solely on the vertical load distribution and geometry of the contact patch and can be calculated prior to estimator operation. Because Eq. (37) utilizes the limit conditions for each region, this friction uncertainty estimate is conservative.

Determination of Whether Saturation Conditions Occur in Practice

Figure 18:
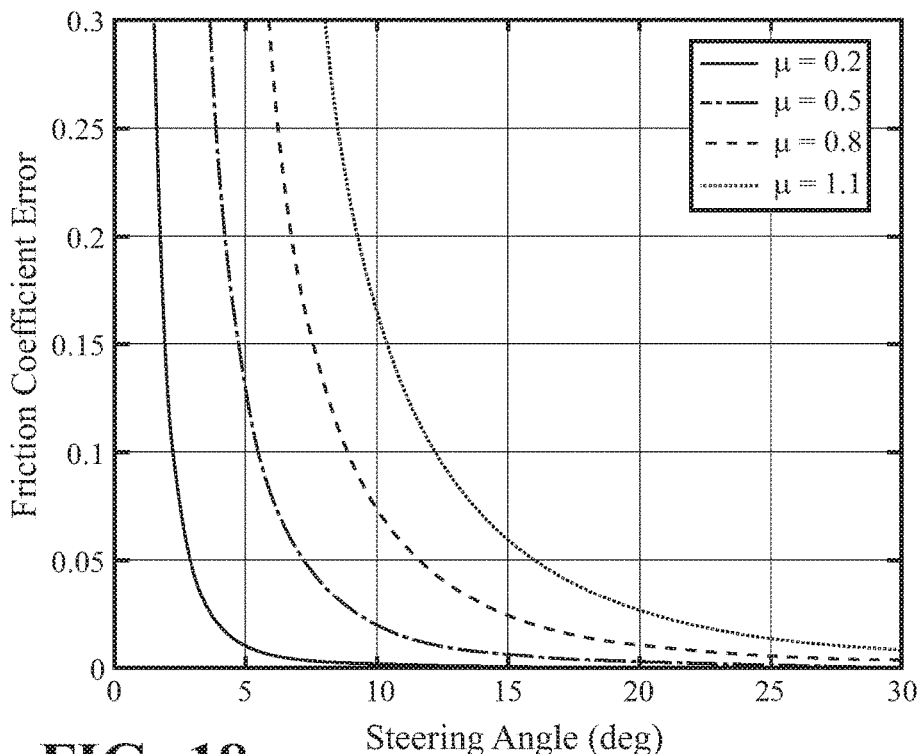
FIG. 18 is a plot showing the friction error as a result of unsaturated brushes over a range of steering angles.

FIG. 18 shows the calculated friction coefficient uncertainty for various $\delta_{rev}$ steering angles at several different friction coefficients. As is expected from the model, larger steering angles are required to accurately sense large friction coefficients due to the need to generate larger brush deformations before the brushes are friction-limited. Encouragingly though, friction coefficients of 0.8 and below can be sensed with less than 10% error at just over 10 degrees of steering angle. Friction coefficients above 0.8 require larger steering angles, but these conditions represent normal driving and thus detection is less critical as it would not typically require any action. The threshold steering angles can be placed in driving context using the Ackermann steering relationship [62] which states that, for low-speed kinematic steering with no slippage, a vehicle's turn radius R is related to the road-wheel tire angle δ and vehicle length L by:

$$R = \frac{L}{\delta}. \quad (38)$$

It is common in the era of power steering for drivers to make steering adjustments while momentarily stationary while transitioning from reverse to forward motion. An example calculation can be used to estimate whether such a maneuver would allow friction estimation. Equation (38) implies that for a vehicle with a 2.5 m wheelbase, any turn with a radius of less than 14.3 m requires a steering angle large enough to make reach the 10% or lower uncertainty. Turns with radii of much less than 14.3 m are often seen in parking lot maneuvering and turns onto cross-streets, yielding many opportunities to generate estimates with reasonable uncertainties. Note that the uncertainty described in this section is simply the modeling uncertainty associated with ignoring the saturation criterion for a circular central region of the contact patch. Measurement uncertainty will also contribute to the uncertainty in the final estimate, and will be much more significant for small friction coefficients and large steering angles.

Implementation

Equation (36) provides a physics-based criterion for the steering angle needed to ensure that the scrub torque is governed by the friction force between the tire and the road surface. Provided this condition is met, it is possible to invert the saturated steering torque relationship and calculate the friction coefficient of the surface (34). In fact, the relationship between the measured steering torque and the friction coefficient is linear assuming a constant vertical force distribution $q_z$. Thus, the evaluation of the integrals to obtain the linear coefficient can be performed offline and computation time for the friction estimate is negligible. However, (36) is a function of the time-history of the steering angle and the integral form is not easily used within an estimator formulation. Therefore, a finite state machine approach is used to estimate the state of the tire and transform the integral criterion into a series of state transitions based upon the steering angle itself.

Figure 19:
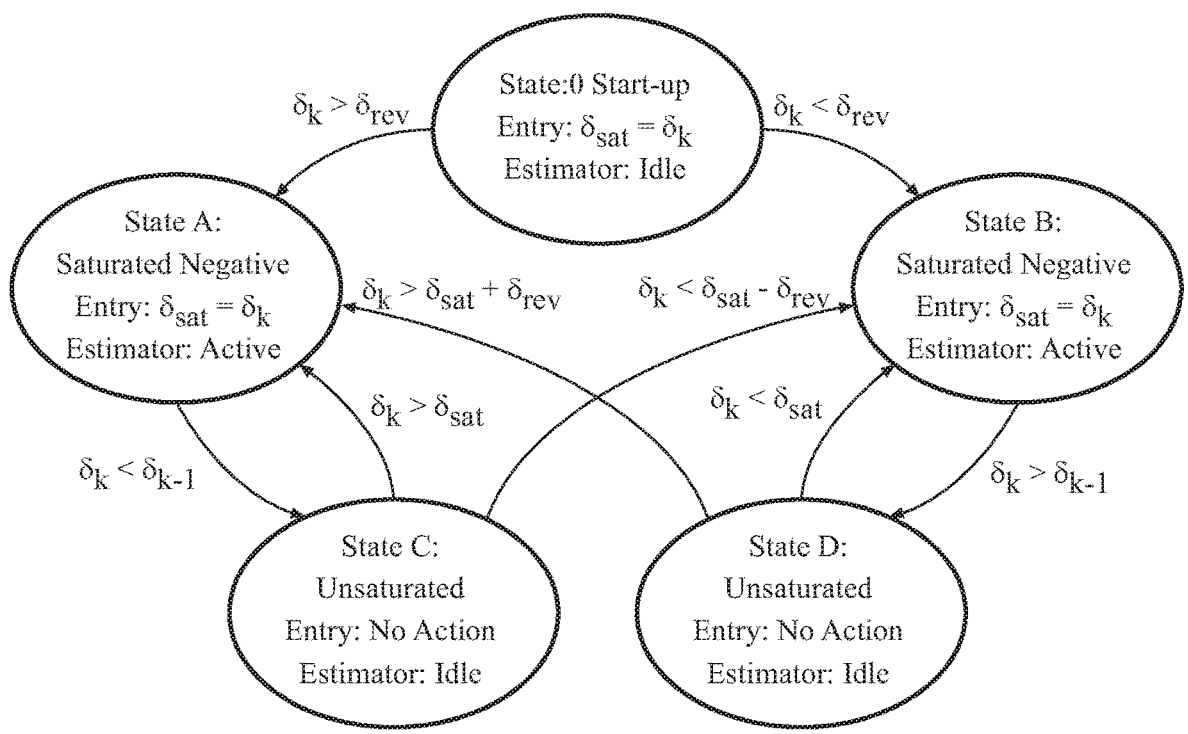
FIG. 19 is diagram showing a finite state machine for determining the estimator validity based on steering angle history.
Figure 22:
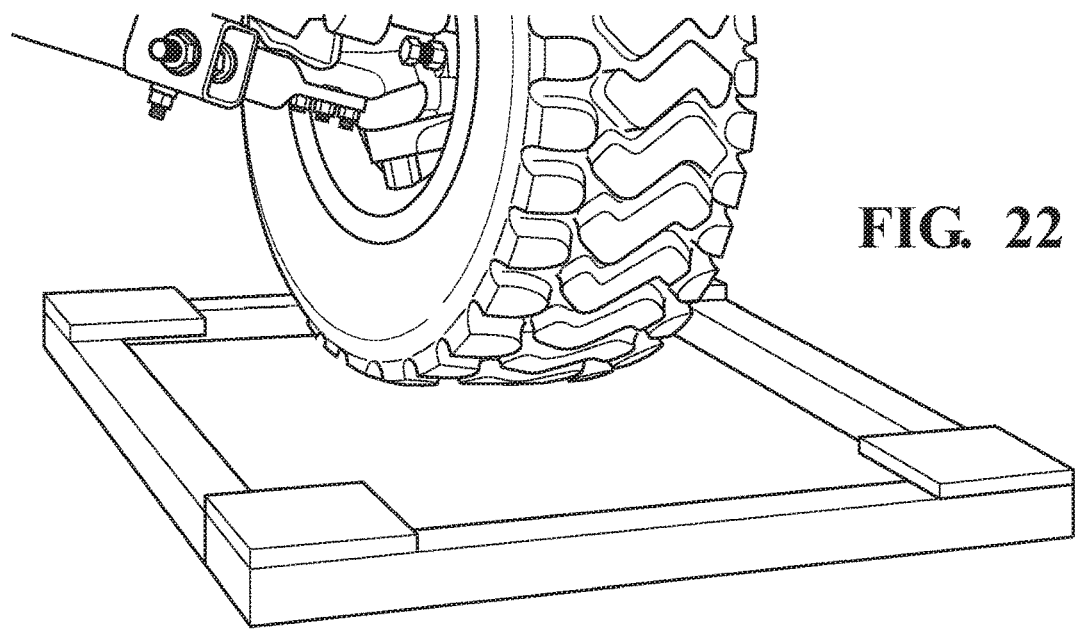
FIG. 22 is a photograph showing an experimental setup for scrub torque testing on sheet ice.

The finite state machine (FSM) illustrated in FIG. 19 is used to determine whether the brushes are saturated, based on equation (36) and the history of the steering angle. State 0 in the model is a start-up state which holds the estimator idle since the state of the tire brushes is unknown. Transition out of State 0 occurs when the steering angle reaches $\delta_{rev}$, the angle at which it is known that regardless of the previous brush states, all brushes outside the critical radius have been sufficiently deformed to reach the friction limit. At this point, the state transitions to State A or State B, the saturated states for left and right steering, respectively. In these states, the estimator is active since the brushes are known to be saturated and the most recent angle at which the tire operates in saturation is stored in the variable $\delta_{sat}$. Transition out of these states occurs only for a reversal of steering. That is, if the FSM operates in State A, increases in the steering angle keep the FSM in State A. However, any motion in the negative direction causes an immediate transition to State C. Similarly, any positive steering while in State B causes an immediate transition to State D. In State C and State D, the brushes are known to have been relieved of some stress and thus the estimator is idle while the tire is unsaturated. Transitions from State C and State D can happen in one of two ways: the tire is turned back in the direction it was recently saturated past $\delta_{sat}$, the previous angle at which the tire was known to be saturated, or the tire is turned in the opposite direction to $\delta_{sat}+\delta_{rev}$, far enough to saturate the brushes in the opposing direction. An example steering angle history is shown along with the saturation angle, $\delta_{sat}$, and the FSM state in FIG. 20. This plot illustrates that it is possible to obtain sufficient steering excitation even in cases where the steering input contains many reversals with small incremental changes in the angle.

To validate the estimator design, simulated data from the uniform-uniform distribution illustrated in FIGS. 15 and 16 was passed through the estimator. The results, as seen in FIG. 21, illustrate that during periods where sufficient excitation is provided, the estimator is capable of recovering the sliding friction coefficient of the surface. This is the expected behavior of the system, as the FSM ensures that the tire brushes are saturated—aside from the small ignored center region—and thus the estimated friction coefficient is that of the saturated brush forces.

Stationary Tire Model Experimental Results

To test the estimator, steering sweeps were done on three surfaces, using the same steering profile illustrated in FIG. 12, which was designed to produce cycles of brush stress buildup and relaxation, obtain brush saturation in both directions, and to show via dither signal the effect of the brush stiffness prior to full friction saturation. The first surface was painted indoor concrete, the second was the same concrete after wetting to a level that water visibly flowed on the surface, and the third surface was a sheet of ice frozen into a frame that was fixed to the floor. This wetted surface should correspond to a water depth of 0.5 mm, which in roadway design is the depth sufficient for surface ow to begin, and is the same depth typically used for on-road friction measurements. The icy surface was sufficiently thick, more than 1 cm, to ensure that the tire was solely in contact with ice. A diversity of surfaces represents a difficult challenge for friction estimation, as surface conditions can affect both the linear portion and peak of the tire-force curves in relationships that are strongly surface-dependent. The same 225/50ZR15 Kumho Ecsta PS31 all-season tires and 34 psi inflation pressure were used for each experiment.

Figure 23:
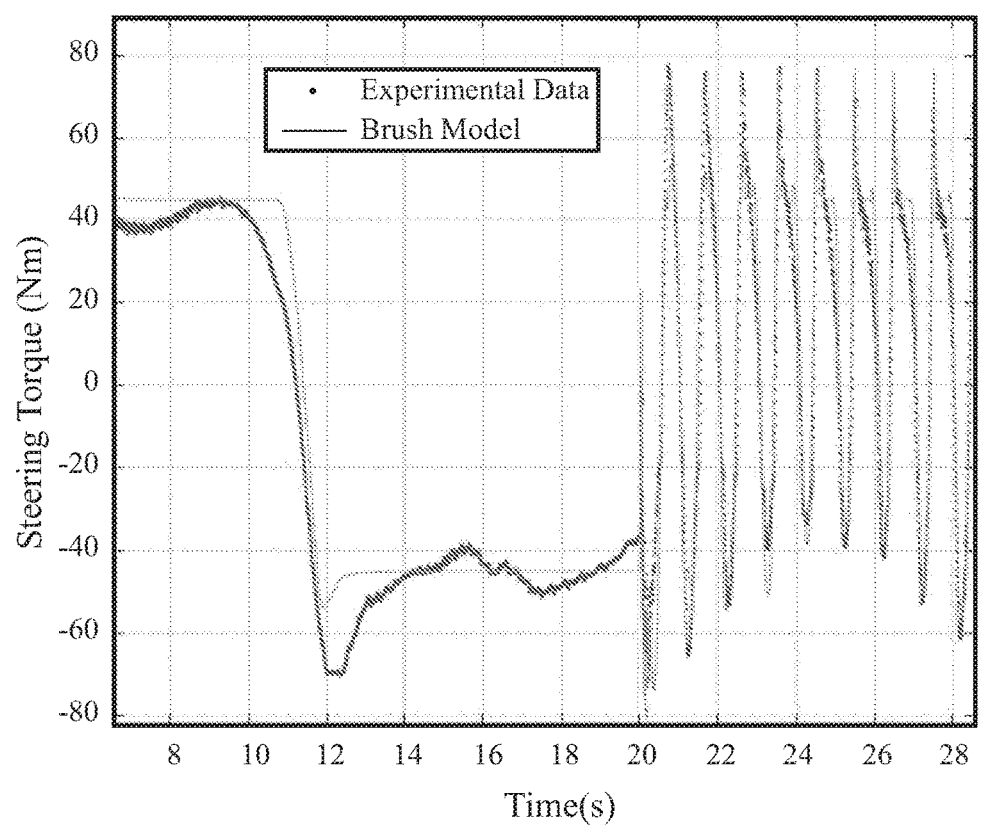
FIG. 23 is a plot showing experimental and model results of steering torque time history from stationary steering excitation.
Figure 24:
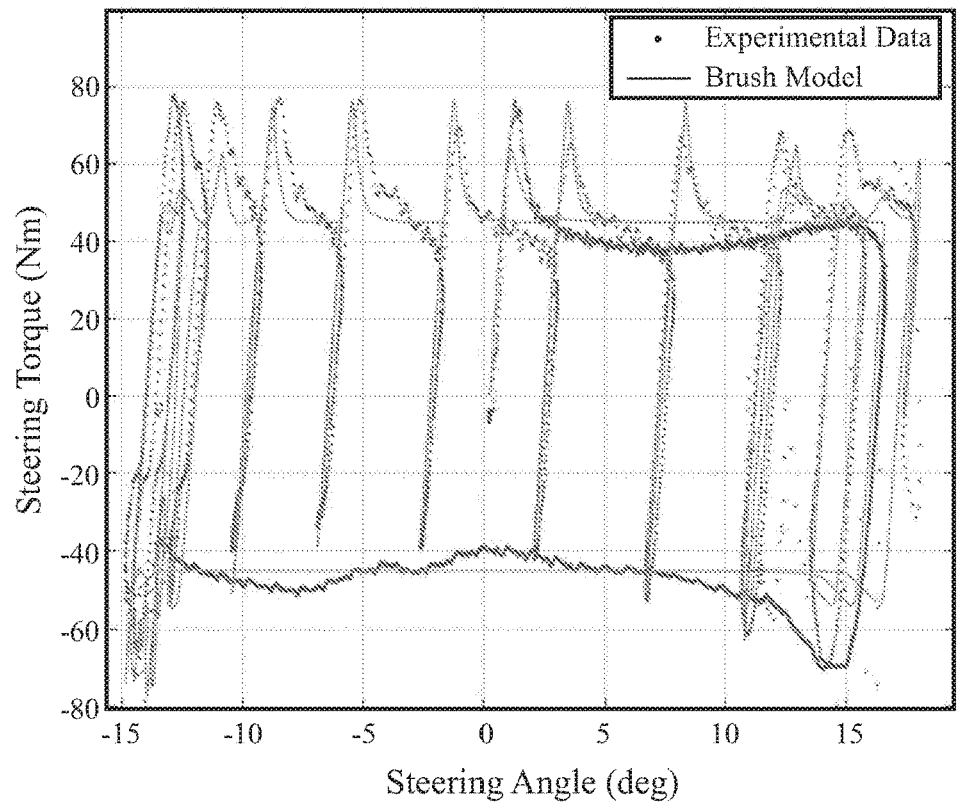
FIG. 24 is a plot showing experimental and model results of steering torque versus steering angle from stationary steering excitation.

FIGS. 13 and 14 presented earlier provides the experimental data and model fit for the clean concrete surface. FIGS. 23 and 24 offer the same plots for the sheet ice surface. The $\mu$ and $\mu_s$ values utilized for the models shown in these plots were hand-fit to demonstrate that the models are capable of representing the tire scrub dynamics on the variety of surfaces used.

The estimation algorithm described in the previous section was applied to the experimental steering torque and steering angle measurements plotted previously in FIGS. 13-14 and 23-24. The finite state machine was used to identify portions of the data wherein the tires were approximately saturated and Eq. (34) was used to calculate the friction coefficient, assuming quartic longitudinal and uniform lateral normal force distributions.

Figure 25:
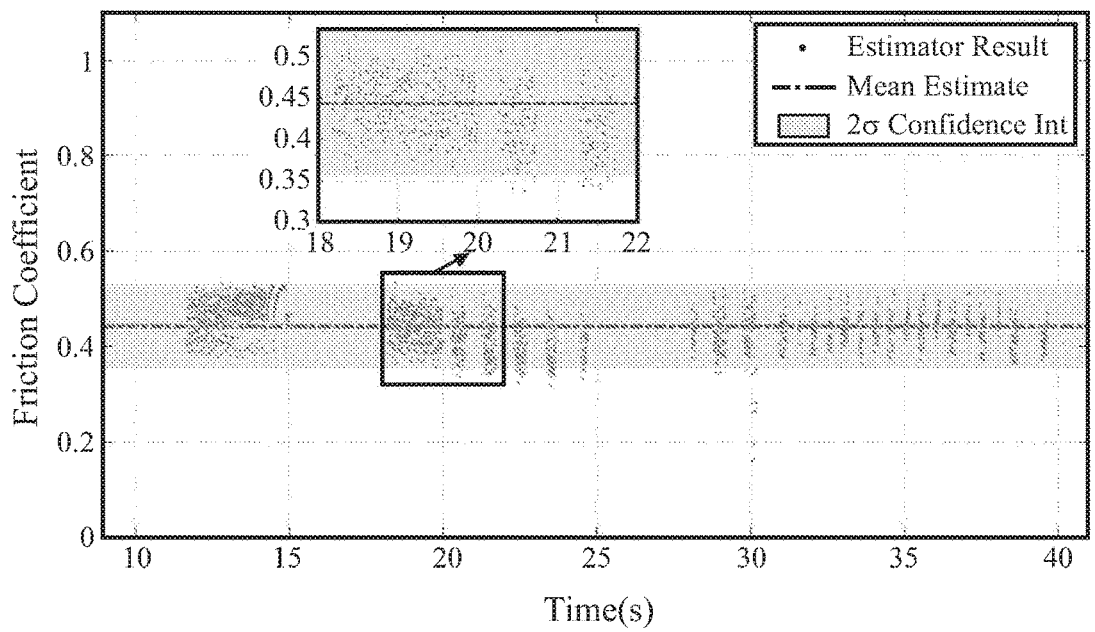
FIG. 25 is a plot showing friction estimation results on dry concrete.
Figure 26:
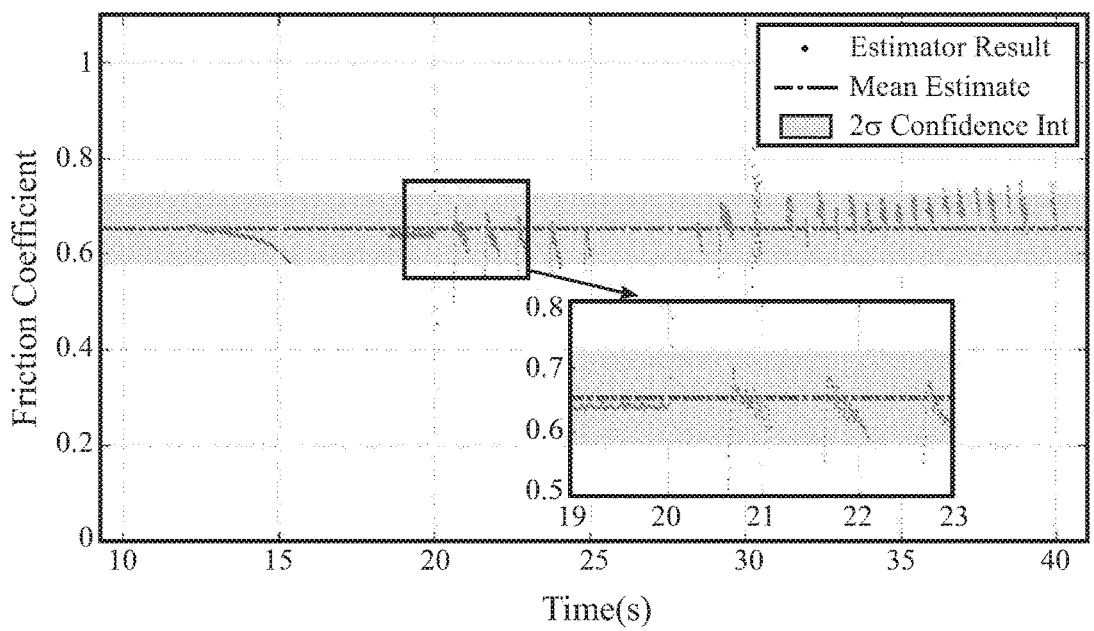
FIG. 26 is a plot showing friction estimation results on wet concrete.
Figure 27:
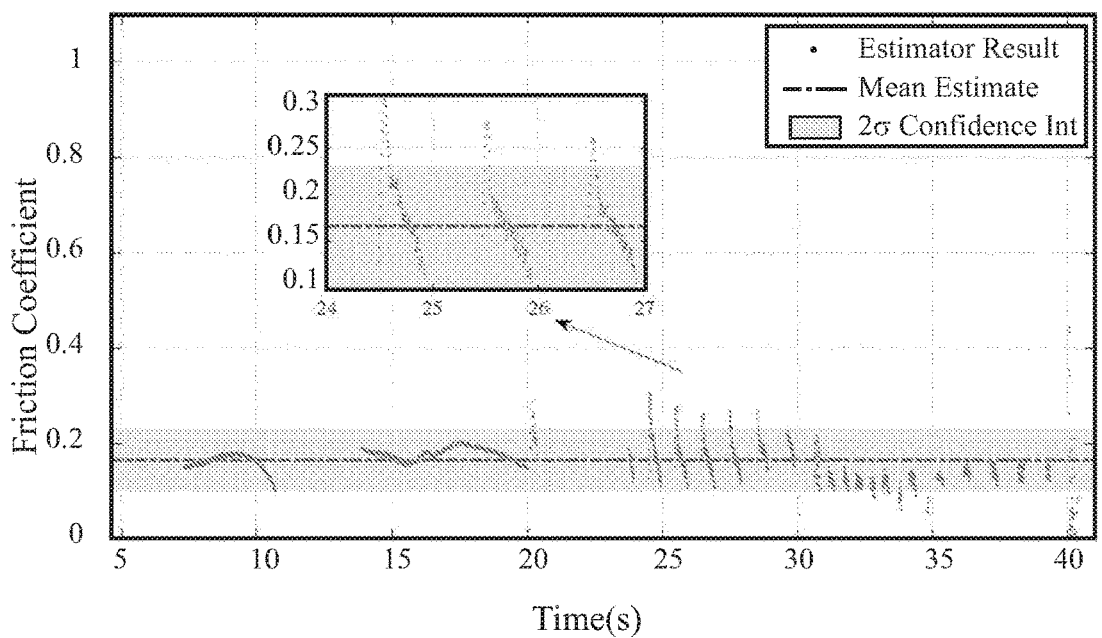
FIG. 27 is a plot showing friction estimation results on icy concrete.

The results from the estimator are shown in FIGS. 25-27. The data are plotted along with the calculated mean value and the $2\sigma$ confidence interval for the data. Gaps in the estimator output represent periods where the brushes were unsaturated and estimation was paused. Overall, the results indicate that estimation from steering torque with a stationary vehicle yields a strong indication of the tire-road friction characteristics. There is variation over the time history of each of the estimates, but this is visually magnified by the long time scale of the plot, making outliers in the data dominate the larger number of points falling into a smaller band. The zoomed inset plots illustrate this, showing a higher density of points near the middle of the confidence interval with a few points falling farther away from the mean. Some of this variation is a result of tire "shudder" that occurs as the various tread blocks of the tire experience subsequent stick-slip cycles. Since there are many of these blocks being loaded at different rates and experiencing subtly different road surface conditions, this variation is expected in the experimental data.

Also worthy of note in the results is the direct calculation of the friction coefficient at each time step. Once the FSM determines that the system has sufficient excitation, an estimate may be made immediately. As described previously, there exists a linear relationship between the steering torque and friction coefficient in the saturated operating condition and the computation time to determine an estimate is negligible. Thus, there is no need to determine an appropriate convergence time or sustain excitation for a long period of time. Provided the appropriate steering excitation has occurred, a single sample yields actionable information and twenty samples reduce the observation uncertainty nearly to the steady-state uncertainty associated with the friction process.

This is a key aspect of the estimator design, as the wheels must be turned while the vehicle is stationary. This is expected to occur for short periods in many phases of vehicle operation, but will not be a persistent condition. As such, this estimation approach provides periodic updates of "surrogate" information about the roadway. That is, the estimates are valid estimates of the friction characteristics for a twisting tire at one point in the roadway, but there is no guarantee that tires generating lateral forces on subsequently encountered roadway surfaces will share these same characteristics once the vehicle is underway. Still, the surrogate approach provides value as it allows drivers and vehicle safety systems to generate a first estimate of the road conditions prior to high-speed safety-critical operation.

Other trends seen in the plots include some "wandering" of the friction estimate up and down within the confidence interval and a peak-and-rolloff friction behavior, particularly on the icy surface. The former of the effects is mostly due to unmodeled effects resulting from the orientation change of the wheel as it is steered through the complete range of motion. The latter peak-and-rolloff behavior is likely a result of estimating only a single friction coefficient while the tire itself brushes the surfaces, displacing water and/or ice; one can see that friction roll-off is more pronounced in wet and icy conditions. A slightly counter-intuitive result is that the wet concrete appears to have a higher friction coefficient than the dry concrete. The authors suspect that this is the result of performing tests with very low relative velocities of the tire rubber on the concrete compared with normal driving operation, and the fact that the test was done on a very smooth concrete surface in a well-kept garage faculty rather than a roughened concrete roadway. For a wet road and high-speed driving, one expects that the water film would reduce friction slightly by creating localized hydrodynamic barriers between the tire and the road surface. For very low relative velocities between tire and road, it is unclear if this barrier would exist and thus lower friction coefficients may not occur. The repeatability of this result suggests that there may be rubber contact effects occurring for very low relative velocities that deserve future investigation. This illustrates that the estimation process is sensitive enough to identify changing surface conditions, even if the underlying processes are not completely understood.

Slow-Rolling Tire Model Numerical Analysis

The model presented in the Slow-Rolling Tire Model section includes a fully transient model, defining brush stress build-up and relaxation as a result of steering rate and wheel velocity sequences. In this section, the model dynamics are numerically integrated to simulate the model behaviour over a range of inputs.

All of the simulations presented are for the dynamics of a single rolling tire as defined in Algorithm 1 and Eq. (b1)-(b5), (c1)-(c5) above. The spatial discretisation used was chosen by iteration, converging on a value of 2 with confirmation of numerical convergence verified using a spatial integration spacings of 0.05 and smaller, which gave numerically indistinguishable results. The simulation parameters are listed in Table 2.

TABLE 2

Tyre Scrub Model Parameters
Table 2 Tyre Scrub Model Parameters

| Parameter | Symbol | Value |
|---|---|---|
| Patch half-length | a | 70 mm |
| Patch half-width | w | 101 mm |
| Tyre vertical load | $F_z$ | 4200 N |
| Brush stiffness | $C_\tau$ | $3.5 \times 10^7$ Nm$^{-1}$/m$^2$ |
| Center of rotation (x) | $x_c$ | 30 mm |
| Center of rotation (y) | $y_c$ | 0 mm |
| Grid spacing (x) | $d_x$ | 2 mm |
| Grid spacing (y) | $d_y$ | 2 mm |
| Quartic slope factor | $\gamma$ | 1.0 |
| Central load fraction | $\chi+, -$ | 0.77 |
| Central load factor | $\nu$ | 0.86 |
| Time step | $\Delta_t$ | $d_x/V_{wh}$ |

Brush Stress and Scrub Torque Distribution

One useful result from simulating the tire contact mechanics is the ability to examine the distribution of the brush stresses and associated moment contributions that together formulate the tire scrub torque. Two integrated distributions are shown in FIG. 7 and FIG. 8, where the ratio of steering rate to wheel velocity was ten times greater in FIG. 8, allowing a more significant build-up of brush stress as compared to FIG. 7. Both distributions reached steady-state and exhibit a convex ramp-shaped surface in the front of the contact patch, characteristic of brush stress being built up while being continuously shifted backward in the contact patch. Large moments are generated at the edges of the contact patch where the distances to the centre of rotation are large, resulting in both large brush deflection and large moment arms. The brushes in the centre of the patch contribute much less torque due to lower stress and smaller moment arms. Furthermore, the cross product of x and $\hat{\delta}$ changes signs as the brush travels past $x_c$ and the component of the brush stress in the y direction builds and then decays. This is most evident at $y=y_c$ where there is no brush stress component in the x direction to mask this increase and decrease along the longitudinal direction. In the case of FIGS. 7 and 8, $y_c=0$ and this effect is prominent along the longitudinal centreline of the tire as evidenced by the lack of stress build-up.

At a longitudinal coordinate of $x_t(y)$, which varies across the width of the contact patch, these surfaces intersect the vertical force distribution, the quartic $q_z(x, y)$ in this case, which dictates the brush stress from the intersection to the trailing edge of the patch. A discontinuity is also seen in the distributions as the brushes transition from adhesion to sliding friction at the intersection of the two surfaces.

Transient Response

To investigate the transient behaviour of the tire model while rolling, a manoeuvre was designed where the steering rate was held constant at the given value for two seconds from simulation start, providing a minimum travel of greater than two complete contact patch lengths, $\int_0^t V_{wh}=4\alpha$, for all considered speeds at which point the steering rate was zeroed and the brush stresses relaxed as the wheel rolled for two additional seconds.

The brush stress distributions were integrated at each time step using (c5) to obtain a steering scrub torque for the entire patch throughout a manoeuvre. The results of these simulations are shown in FIG. 28 and FIG. 29. In FIG. 28, the steering rate and friction coefficients were held constant while the vehicle velocity was varied. The curves demonstrate that as speed increases, the tire reaches the steady torque value in a shorter period of time but the steady torque value reached decreases. As the vehicle speed approaches zero, the steady torque values converge to a single limit value, the stationary steering scrub torque.

FIG. 29 demonstrates the results when the vehicle velocity is held constant and the steering rate is varied. Similarly to FIG. 28, increasing ratios of steering rate to wheel velocity result in larger magnitude steering scrub torque. The other trend that can be seen is the lower limiting value of the convergence time. At 0.2 m/s, the tire rolls through one complete contact patch distance in 0.7 seconds, marked in the plot with a vertical dotted line. At all steering rates, this is the time by which the steady value is reached. However, at higher rates, the steady value is reached earlier as a result of the significant twisting motion which quickly saturates the brushes from the rear through most of the contact patch and eliminates the need for the tire to roll through an entire patch before reaching the steady value.

Interestingly, the rolling motion of the contact patch generally improves convergence time to the steady value over the stationary case. In the stationary case, there are brushes near the centre of rotation which require significant accumulated steering angle—and thus time at a constant steering rate—to reach saturation due to the small radius and thus small linear motion. The rolling mechanism causes these relatively unstressed brushes to get transferred to locations farther away from the centre of rotation where they are more rapidly deformed. As a result, the entire contact patch reaches saturation more quickly in the rolling case.

Slow-Rolling Experimental Validation

A series of experiments was designed to validate the model presented in the previous sections. These experiments utilised a drive-by-wire experimental test vehicle to obtain steering torque measurements at approximately constant speed and steering rates, matching the conditions for which the results are presented in FIG. 29. This vehicle, referred to as P1, can be seen in FIG. 10.

The front wheels of P1 are equipped with a pair of Michigan Scientific LW9.5 wheel force transducers which provide direct measurement of the tire forces and moments. Constant velocity operation was enabled by creating a PID feedback loop using the electric rear-wheel drive motors and the front wheel encoders provided by the wheel force transducers. Constant steering rates were created with a similar PID feedback loop incorporating the steering servo motors and the associated encoders which provide an angular measurement resolution of 0.00225 degrees at the steering gearbox outputs. A kinematic mapping is utilised to obtain the roadwheel angle from the gearbox angle, enabling closed-loop control of the road wheel angle. Some backlash and compliance is likely present between the steering servo and roadwheel but quantifying these effects requires specialised test equipment that would be unavailable for a typical consumer car, especially for continuous updating over the lifespan of the car. Therefore, these effects in the steering system are assumed negligible; this assumption is revisited in discussion of the experimental results.

FIGS. 30-31 illustrate the data collected from the basic manoeuvre, where FIG. 30 shows the steering rate—obtained via the differentiated steering angle—and FIG. 31 shows the measured torque about the vertical tire axis for several trials at two different steering rates. The steering rate is observed to ramp up to the desired value since the steering system must overcome the inertia of the wheel in addition to the torque generated with the driving surface. The steering rate also varies around the 5 degree/second setpoint, though this is partly due to the fact that the plot was generated by numerically differentiating and filtering the steering angle since no direct rotational velocity measurement is available. The real steering rate is likely smoother as the PID controller itself is set to track a ramp profile of the steering angle rather than the differentiated steering rate. Regardless, after a few tenths of a second of transient, the steering rate is well controlled to the desired steering rate.

FIG. 31 shows that the steering scrub torque was observed to start near zero for each of the trials, though there are minor variations due to road irregularities, slight differences in the pre-manoeuvre steering input, changes in normal load and other unmodelled disturbances. The torque value ramps to approximately its steady value by the time the tire has rolled one contact patch distance. Once the steering ramp is complete, the wheel is held at a constant angle and the torque from twisting the tire is relieved by the rollout of the tire, though the torque does nor return to exactly its pre-manoeuvre value. This is likely an effect of the aligning moment associated with the wheel being operated at a significant steady steering angle. Even at very low speeds, some lateral force is developed at the wheel and results in a small return-to-centre torque. Furthermore, the Ackermann geometry feature of the steer-by-wire system was turned off to ensure constant steering rates over the entire steering sweep of each manoeuvre. This likely resulted in additional steady torques as the inner and outer wheels were each set to the average steering angle and thus would be slipping relative to the ideal path. These torques increase with increasing steering angles and persist once the steering ramp is complete, providing a mechanism that results in a slightly negative torque on the inside wheel and a slightly positive torque on the outside wheel (not shown) for the latter part of manoeuvres that result in small radius turns. These results agree with the inner wheel needing to turn more to travel the proper kinematic path while the outer wheel needs to turn less. Fortunately, these effects are seen as a response to the steering angle, not the steering rate, and are small relative to the magnitude of the steering torques at large steering rates.

FIG. 31 also provides a comparison between the model and experimental data. The steering data sets for the 2 deg/s and 10 deg/s runs were grouped and averaged to obtain a mean steering input for each condition. This steering sequence was then used as the steering input for the torque model, yielding the solid and dash-dotted lines in FIG. 31. The experimental data, shown in dashed lines with different shaped markers, was corrected for the aligning moments generated as the car travelled with the wheels turned. This aligning moment model assumes a kinematic motion such that the centre of rotation is the centreline of the car at the rear axle. Thus, the slip angles for the left and right wheels are $$M_{align_{L/R}} = t_p C_\alpha \left( \frac{Lr}{U_x \mp \frac{t}{2}r} - \delta_{L/R} \right) \tag{39}$$

where $t_p$=0.006 m represents the moment arm of the torque, $C_\alpha$=50000 N/rad is the cornering stiffness of the tire, L=2.5 m is the vehicle wheelbase, $$\frac{t}{2} = 0.81 \text{ m}$$

is the half-track width of the vehicle, and $U_x$ and r are the body-fixed longitudinal and rotational velocities of the vehicle in ISO coordinates. Of note, the expected aligning torque for low-speed steering is smaller than what would be expected for high-speed steering. It is suspected that this is due to the non-uniform slip profile under the tire caused by turning and forward rolling motion combined. While this effect is small enough that numerical calculations agree with experimental data, this assumption could be revisited in future work.

Overall, the data matches the model relatively well. The trends for rate of torque increase, total torque generated, and roll-off dynamic agree with the model. There are some deviations, particularly with the ramp-up and roll-off rates. These are likely the result of additional unmodelled compliance in the system, including elastic elements in the steering system and the tire carcasses which may twist independently from the tread rubber. One other potential source of error in the steady values from 2 seconds into the experiment onward—the period with constant steering angle—is the unmodelled aligning moment from the wheel slip angle and zero Ackermann steering geometry previously mentioned; thus yielding steady torque offsets such as those seen once the brush stresses from steering rate have been relaxed via rolling.

Figure 32:
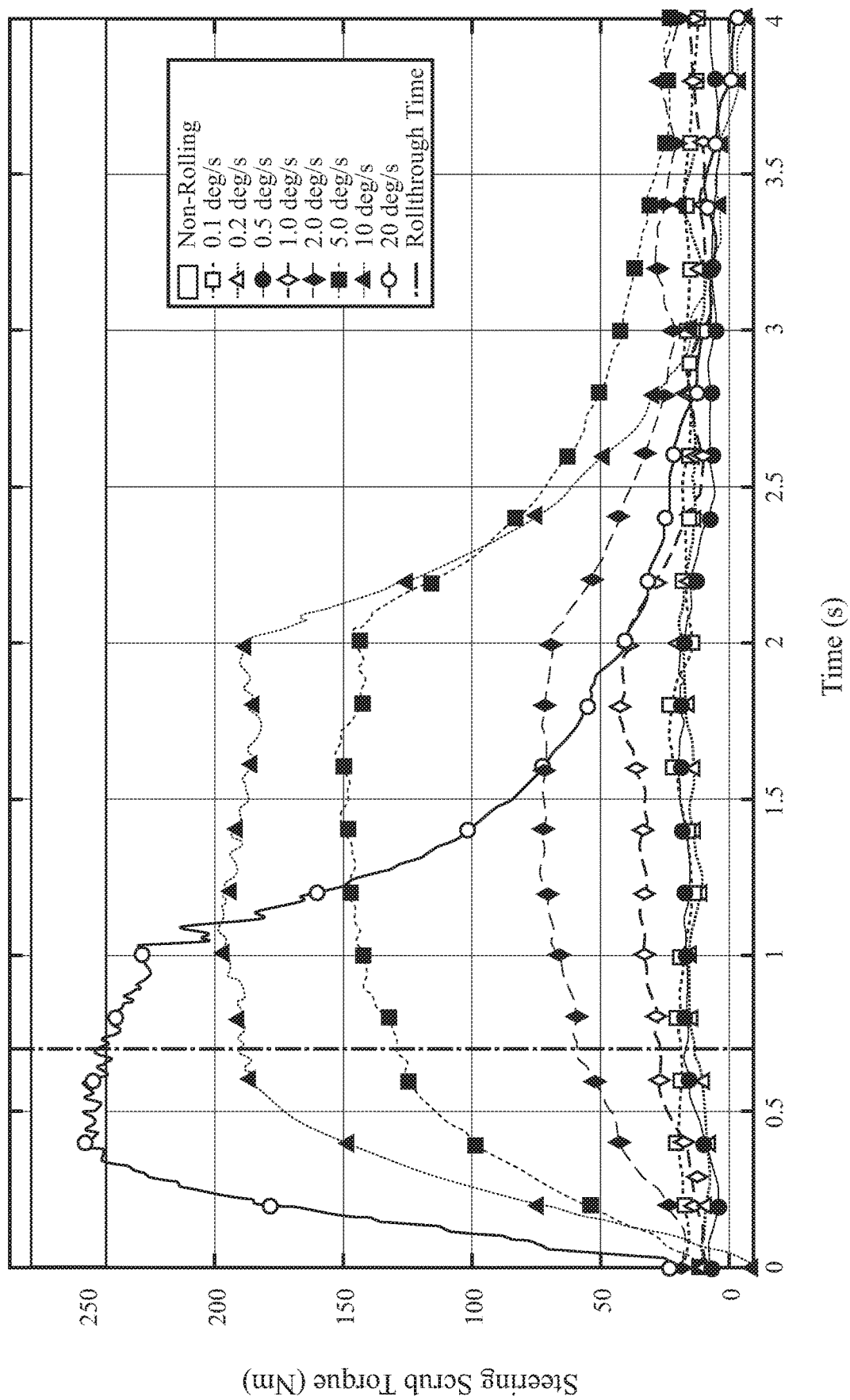
FIG. 32 is a plot showing experimental transient steering manoeuvres on dry asphalt, where torque increases with increasing steering rate.

FIG. 32 illustrates the results of a series of manoeuvres at 0.2 m/s velocity and 0.1, 0.2, 0.5, 1.0, 2.0, 5.0, 10.0, and 20.0 deg/s steering rates. The manoeuvres were done on clean and dry asphalt in the same location and with the same duration other than the 20.0 deg/s manoeuvre, where the duration was halved due to the steering lock limitation of the vehicle. The grey band at the top represents the approximate saturation value of the tire scrub torque, obtained by adding ±15 Nm of uncertainty to the mean value of the torque obtained in steady-state for a stationary steering ramp. The 20.0 deg/s steering manoeuvre approximately saturates the scrub torque. Experiments with larger ramp rates were observed to provide scrub torques slightly closer to the saturation value, but the data is omitted due to the fact that the steering system servomotors on the experimental vehicle lack the power to generate consistent steering rates at higher target values. A dotted line at 0.7 seconds marks the time within the manoeuvre at which the tire has rolled a distance equal to the contact patch length at the 0.2 velocity. This convergence time is seen to capture most of the increase in steering torque, though for some trials there are small increases in torque throughout the entire steering sweep. Again, this small increase is likely build-up of aligning torque from Ackermann error and slip angle since the steering angle increases throughout the manoeuvre. At higher steering rates, the torque is also seen to converge to the steady value prior to travelling a full contact patch distance, as predicted with the model. Roll-off is a bit slower than the model prediction, and is likely due to the need to relax both the tire tread as well as any additional compliances in the tire carcass and the steering system.

The data sets shown in FIG. 32 also were processed and the average measurement from the quasi-steady-state portions of each experiment was compared to the value obtained from the steady-state model. For steady state operation, the steering rate and longitudinal velocity conditions can be combined using the concept of turn slip, defined as $$\phi = \frac{\dot{\delta}}{V_{wh}} \tag{40}$$

which relates the turning rate to the travel rate to yield a turning rate per distance travelled. This concept is useful as it allows for the analysis of the system with one independent variable, and the system reaches steady state after the tire has travelled a sufficient distance. While the results been omitted for brevity, the equivalence of the model for various steering rates and velocities with equivalent turn slip were validated experimentally.

Figure 33:
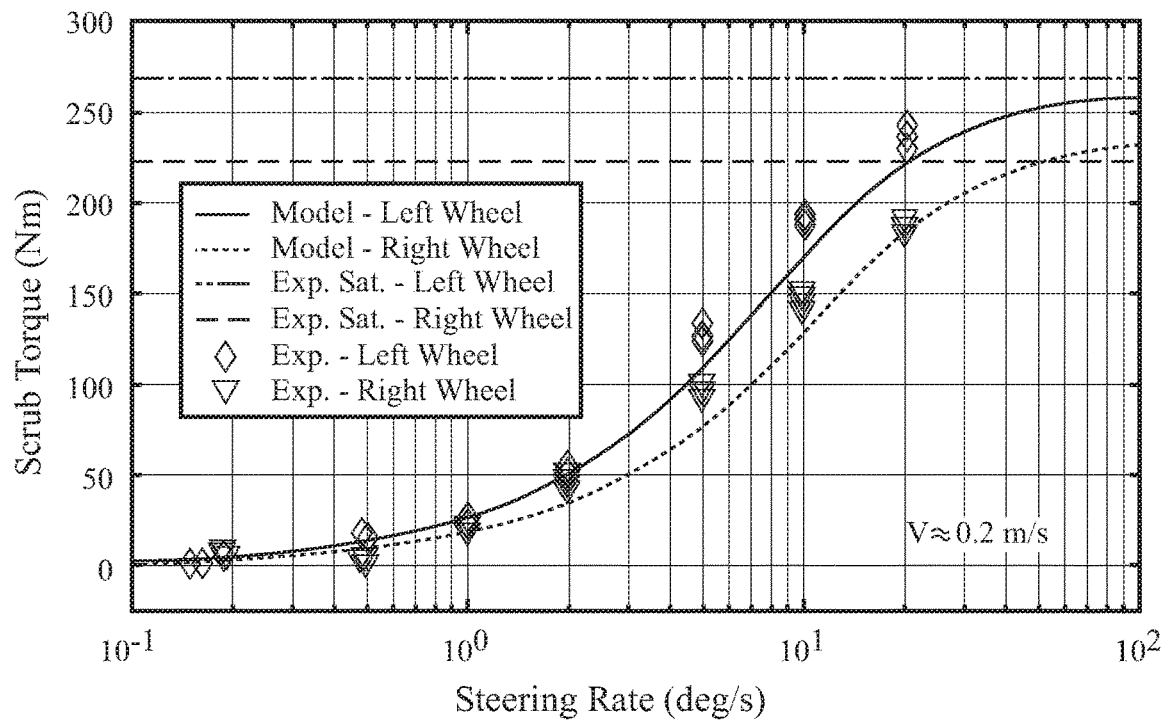
FIG. 33 is a plot showing experimental data and model comparison for various steering rates on dry asphalt.
Figure 34:
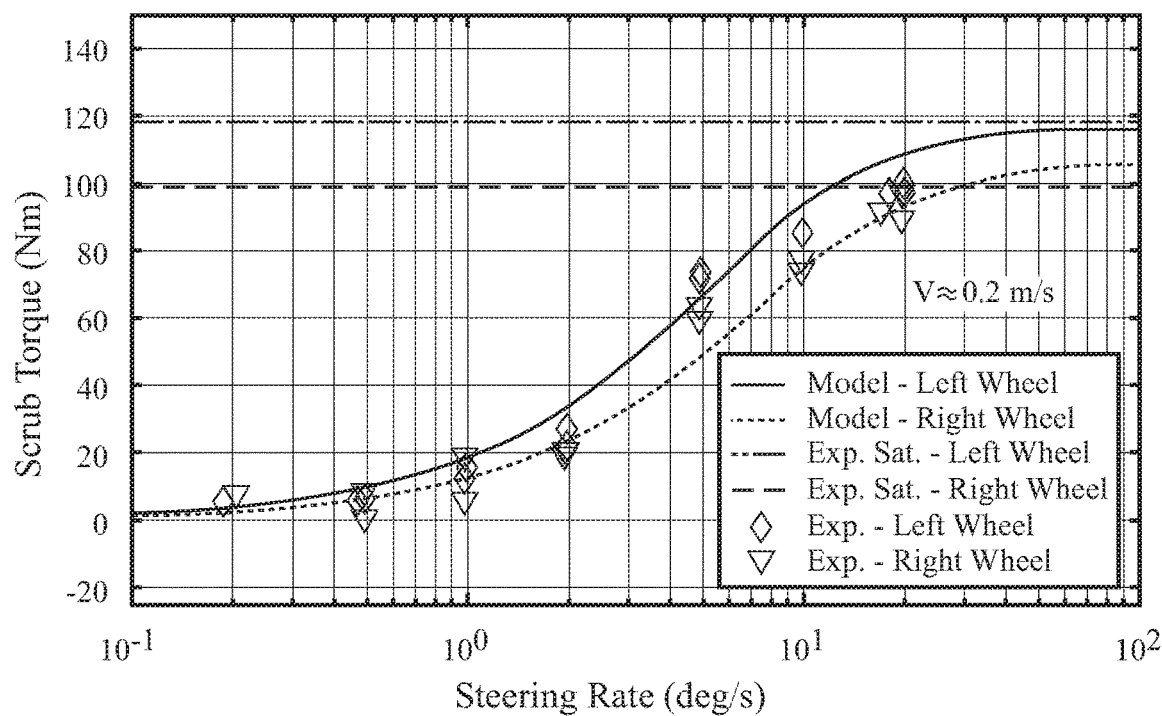
FIG. 34 is a plot showing experimental data and model comparison for various steering rates on corn-covered asphalt.

The results of the steady state analysis can be seen in FIGS. 33 and 34. While there is some variation present between the model and the experimental data, the overall trends and values are in agreement. FIGS. 33-34 illustrate the results of a similar set of experiments performed on a corn-covered asphalt surface. The trends are the same and are discussed in the following sections which will describe the effect of friction conditions on steering scrub torque and how the model may be leveraged to estimate the surface friction under certain operating conditions which provide sufficient steering excitation.

Identifiability of Friction

In addition to the use of the model for steering system design and development, a key motivation for the description of low speed tire scrub torque is to enable opportunistic estimation of road friction conditions during early and low-risk portions of a driving trip. That is, the slow-rolling conditions examined in the previous section are those prevalent when a vehicle is manoeuvred out of a parking location and prior to reaching any higher speed roadways. Thus the ability to utilise the model to estimate surface friction conditions could provide early warning to a driver, or to an autonomous or driver assistance system, that adverse conditions could be present. Furthermore, the conditions for estimation from steering scrub torque are complementary to those required for estimation from steering aligning moment or longitudinal wheel slip, offering an additional opportunity to estimate friction during normal driving operation. For the practical estimation of friction during low speed manoeuvres, two primary factors are examined here: the conditions under which steady-state behaviour can be approximated, and the relationship between measurement error and parametric uncertainty. Additionally, this section examines several confounding factors that can arise during low-speed friction identification, factors that are not as significant for high-speed friction identification scenarios reviewed in the literature.

Pseudo-Steady-State Conditions

For the purposes of steering system design and for friction estimation, it is useful to consider first the simplest conditions under which friction significantly impacts the manoeuvre. For the physical process of the tire to produce steady behaviour that allows friction identification, a portion of the tire contact patch must be friction-limited. Within the friction-limited portion of the tire, this requires that the brushes are fully stressed due to steering, and these stresses must arise despite relaxation behaviour in the contact patch due to the brushes rolling through. Thus, there are combinations of vehicle velocities and steering rates that, for a given friction level, will produce these fully-stressed brush conditions.

The use of several assumptions aids in the development of a friction estimate from the fully transient slow-rolling tire model including assumed initial conditions, conditions of operation, and the roadway environment. The assumptions on the initial conditions are that the tire is relaxed or has been in a steady manoeuvre long enough that transients are not present. The operational assumptions are that the speed is nearly constant, and that there is a period in which roadwheels are steered at a constant rate. Furthermore, it is assumed that the steering system is aligned to removed steady offsets to the steering torque. The tire-surface contact assumptions are that the surfaces are locally level and the area under the tire is uniform in both friction and texture.

Figure 9:
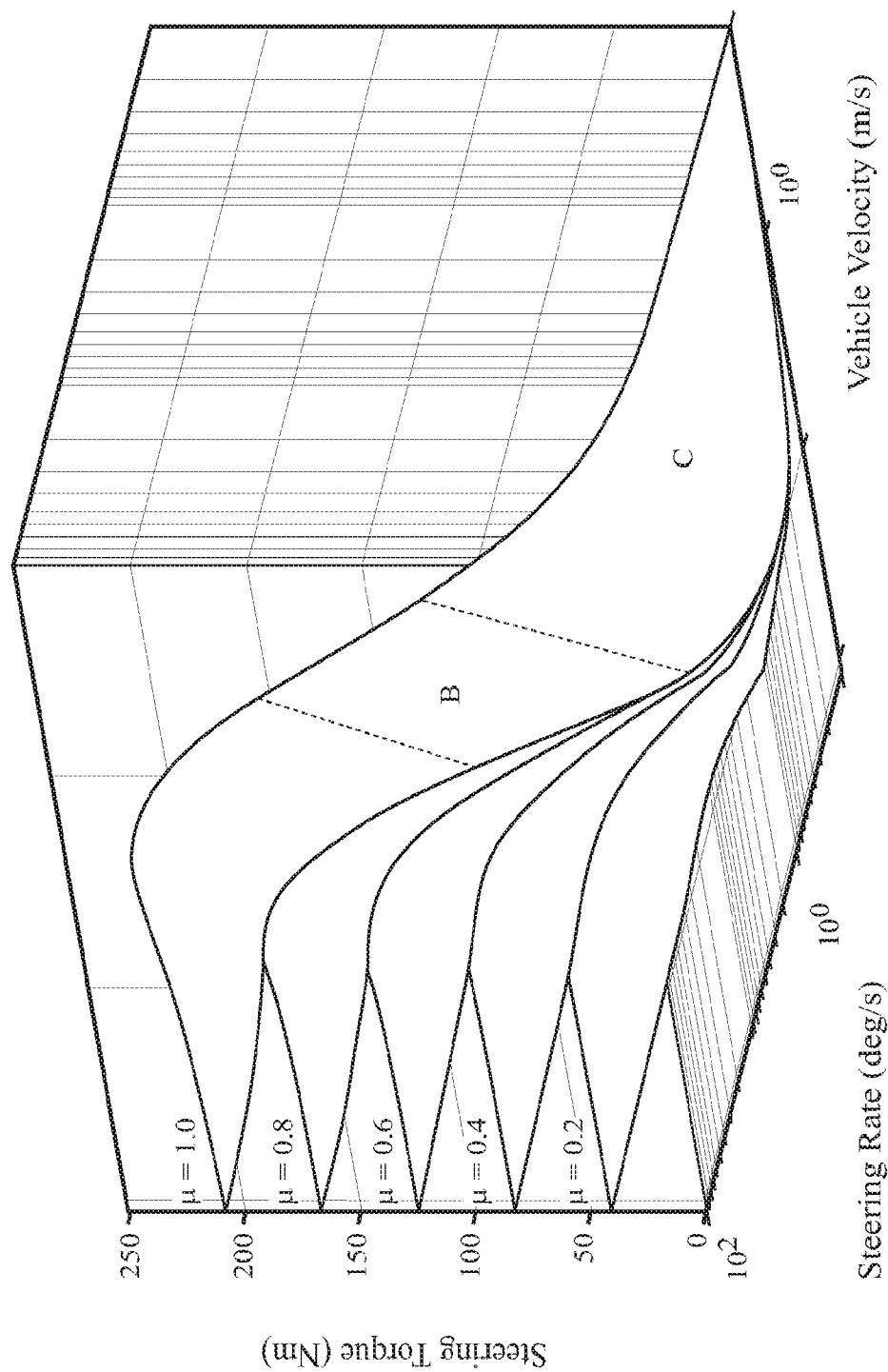
FIG. 9 is a plot showing steering torques for various friction coefficients, vehicle velocities, and steering rates.

To illustrate that only particular combinations of steering rate and speeds produce suitable steady conditions for friction identification, simulation of the tire's behaviour in low-speed rolling was conducted with results shown in FIGS. 9 and 35. FIG. 35 shows the numerical calculation of the steady-state steering torques predicted by the model over a wide range of turn slips, which are then repeated for five different surface friction coefficients thus producing five different curves. These model predictions illustrate the trends of the steady-state model. From FIG. 9, it can be seen that there are three regions of operation, marked A, B, and C for reference.

At the lowest steering rates and highest vehicle speeds and thus the lowest turn slips, Region C, the steering torques converge to approximately a single surface with very low torque magnitudes. In this region, the brush stress distribution is dominated by the very rapid stress relaxation due to rolling. The majority of the contact patch thus experiences brush stress below the friction limit, as seen in FIG. 7. Because the brushes are not deformed enough during the short period in which they are in contact with the ground, they remain unsaturated and the steering torque is dominated by the effect of brush elasticity.

At the opposite extreme is Region A, where for high steering rates with low vehicle velocities and thus high turn slips, the build-up of brush stress occurs rapidly enough that the relaxation from rolling is insufficient to keep the majority of brushes from reaching friction saturation. The torques associated with the five different surface conditions each demonstrate a saturation indicative of the majority of the tire's contact zone in a slipping situation. This tire slip produces torques that saturate at the local friction value, resulting in a clear indication of surface friction via the distinct differences in torque associated with each.

The saturation values of the steering torques are proportional to the friction coefficient of the road surface within Region A, making this region one of particular interest for enabling rapid identification of surface friction from measured steering torques. This is clearly illustrated mathematically by taking the limit as the vehicle velocity approaches zero with a finite steering rate, thus saturating all of the brushes to yield:

$$T = -\text{sign}(\dot{\delta}) \int_{-w}^{w} \int_{-a}^{a} \left\{ \mu_{avg} q_z(x, y) \begin{bmatrix} 0 \\ 0 \\ 1 \end{bmatrix} \times \begin{bmatrix} (x - x_c) \\ (y - y_c) \\ 0 \end{bmatrix} \right\} dx dy. \quad (41)$$

where $\mu_{avg}$ takes on a value in the interval $[\mu_s, \mu]$ as a result of the mix of brushes intermittently adhering and releasing as the tire is rotated and the elastic stresses reach the stick-slip limit. The addition of rolling, even if the rate is extremely small, improves the validity of this assumed form since the rolling eliminates the singularity where no brush stress can be generated at the centre of rotation. Thus, if $\mu_{avg}$ is assumed to be uniform over the contact patch, and the physical dimensions and stresses of the contact patch are assumed quasi-static, $T \propto \mu_{avg}$ and inversion of this relationship to obtain the friction coefficient is straightforward.

In between the two extreme cases is a transition, Region B, where the turn slip is sufficient to saturate a substantial portion of the brushes, but not all of the brushes. Thus, the stress in a substantial portion of the contact patch is also governed by the elastic brush deformation. In this region, the differences between the torques from surfaces with different friction characteristics grow from negligible at low turn slip, to large steering torques bounded by the saturation value given in (41) occurring at high turn slip. Friction levels are identifiable within these transition regions, albeit requiring more complex analysis than the steady-state cases and having higher associated uncertainty.

Friction Estimate Uncertainty Analysis

The rolling steering scrub torque model is dependent on a number of parameters, $\mu$, $\alpha$, w, and $q_z(x, y)$. Assuming that $\alpha$, w, and $q_z(x, y)$ are known, or estimated beforehand, and the steering rate and wheel velocity can be measured, the uncertainty in the friction estimate is a function of the partial derivatives and the measurement uncertainties, $$\Delta \mu = \sqrt{\left(\frac{\delta \mu}{\delta \dot{\delta}} \Delta \dot{\delta}\right)^2 + \left(\frac{\delta \mu}{\delta V_{wh}} \Delta V_{wh}\right)^2 + \left(\frac{\delta \mu}{\delta T} \Delta T\right)^2} \quad (42)$$

In the general case, described by Equation (16), inversion of the model to obtain a value of $\mu$ is impractical since it would require inverting a piecewise function of the saturated and unsaturated regions for which the transition between the two functions varies along the lateral, y, coordinate as a function of $\mu$ itself. Thus it is difficult, even numerically, to obtain any of the partial derivatives. However, Equation (16) can be evaluated numerically with varying values of $\mu$ to obtain approximations of $$\frac{\delta T}{\delta \mu}.$$

Assuming that the measurement errors of the controlled vehicle states $\dot{\delta}$ and $V_{wh}$ are small, the partial derivative of the steering scrub torque with respect to the friction coefficient is instructive in evaluating the efficacy of the estimation technique in a variety of operating conditions.

FIG. 36 illustrates the partial derivatives of the steering torque with respect to the friction coefficient for a range of friction conditions. From these plots alone, it is clear that there are significant regions of operating conditions in which the friction coefficient is practically unobservable or physically unobservable. Below turn slip values of approximately 5 degrees per meter, the difference in torques as a result of changes in friction values is negligible and thus the friction value is unobservable from steering torque. The practical unobservability in the range of 5 degrees per meter to approximately 100 degrees per meter, depending on the friction condition, is a more subtle problem. P1 is equipped with wheel force transducers that are capable of direct measurement of the wheel torques. With this sensing arrangement the uncertainty in the torque measurement, $\Delta T$, is approximately 15 Nm, as seen in the plots in Section 4. The midpoint value of the partial derivatives at 20 degrees per meter is approximately 100 Nm/unit. Hence, at this condition a change in the friction coefficient of 0.1 units is undetectable since it would result in only a 10 Nm change in the steering torque and thus be indistinguishable from the sensor uncertainty. Since implementation of this algorithm on production vehicles would likely require the use of less expensive and likely less accurate sensors, it is clear that friction estimation must be done in the approximately saturated conditions. One encouraging aspect seen in FIG. 14 is that the observable region extends to lower turn slip values for low friction conditions. Thus, is it easier to detect the adverse low friction conditions that might require driver or vehicle action than it is to detect high friction conditions which are of little concern.

If the operating conditions are indeed restricted to the saturation region, the model can be reduced, as discussed above, to Eq. (41). Inverting the model to obtain an expression for $\mu$ yields $$\mu = \frac{|T|}{\int_{-w}^{w}\int_{-a}^{a}\left\{q_z(x,y)\begin{bmatrix}0\\0\\1\end{bmatrix}\times\begin{bmatrix}(x-x_c)\\(y-y_c)\\0\end{bmatrix}\right\}dxdy}. \quad (21)$$

With this form of the model, $$\frac{\delta\mu}{\delta V_{wh}} = \frac{\delta\mu}{\delta\dot{\delta}} = 0$$

since the rolling speed and additional steering rate beyond that required for saturation do not impact the fully saturated contact patch and the remaining partial derivative is simply the negative reciprocal of the double integral in the denominator of Eq. (21). For the tire and loading conditions of the test vehicle, and assuming the tire is operating in steady-state conditions, as described in the next section, this equation reduces to $\mu=1/210\cdot|T|$, with torque, T, measured in Nm. This partial derivative depends implicitly on the total tire vertical load and its distribution, but allows for direct evaluation of the torque-friction relationship, including the use of Eq. (20), once the vertical load model is defined.

Definition of the Steady-State Operational Region

Using the simulated results illustrated in FIG. 35 and the sensitivities represented in FIG. 36, one can define numerical boundaries on vehicle operation for low speeds that define fully friction-dependent behaviour and enable identification. With the turn slip plotted on a log scale, a single line can be utilised to separate turn slip and steering torque operating points which are in the saturated region, Region A, from those that are not, allowing for an easy numerical check to ensure that a friction estimate will yield an accurate solution. The space defined by this boundary takes the form:

$$h_1 \log\phi + h_2 - T_{meas} \geq 0 \quad (22)$$

where $$\phi = \frac{\dot{\delta}}{V_{wh}}$$

and $h_1>0$. The constant $h_2$ may be either positive or negative, and $T_{meas}$ is the steering scrub torque data recorded from the steering system. As representative values for the tires used on the experimental vehicle, $h_1$ was found to be 73.5 Nm/log(rad/m) for turn slips measured in rad/m, and $h_2$ was found to be $-220$ Nm with $T_{meas}$ measured in Nm.

It is also necessary for the steering rate and vehicle speed—and thus turn slip—to be relatively constant for some period used to estimate the friction coefficient, as listed in the assumptions of Section Pseudo-steady-state Conditions. In the likely absence of a direct steering rate measurement, as on the experimental test vehicle utilised in this work, the steering angle measurement can be differentiated twice with an FIR differentiating filter to find the steering acceleration, which must be small to indicate constant steering rate. The bandwidth of the extremely high performance steering system on P1 is limited to approximately 10 Hz and human drivers are typically unable to exceed this, allowing for a heavy filtering of the steering angle to obtain a steering acceleration. This signal can be windowed and the RMS window value evaluated to determine whether the steering rate is constant. When the acceleration falls below the threshold value (a value of 0.2 rad/sec$^2$ in this study), the steering rate can be assumed constant. Next, if the steering rate falls within the space defined in Eq. (22), the steering can be considered to be in the valid estimation conditions. Because of the vehicle mass and the limited lock-to-lock steering range, the longitudinal wheel speed is unlikely to change significantly over the time span of the steering manoeuvre and thus the vehicle speed can also usually be assumed constant. However, the same differentiating filter and windowing approach can be applied to the vehicle speed measurement to ensure constant speed as well.

To illustrate the use of low-speed steering situations to identify friction, a pair of data sets were chosen from field data that fit the criteria above. The first data set was taken at $V_{wh}=0.2$ m/s and $\dot{\delta}=0.2$ deg/s and yielded a steering torque of approximately 10 Nm, virtually indistinguishable from the normal variation in steering torque while maintaining a constant steering angle, which is also approximately 15 Nm. The planar condition is not satisfied and this case fails the validity test. In contrast, another experiment was performed at $V_{wh}=0.2$ m/s and $\dot{\delta}=10$ deg/s and a steering torque of approximately 202 Nm was measured. The condition of Eq. (22) is satisfied and thus the scenario is considered to be near saturation and valid for estimation.

Confounding Factors in Estimation

There are a few factors that make estimation from steering torque while rolling difficult. In contrast with stationary steering, as described in [3], rolling elicits a new set of torques from which the tire scrub torque must be isolated. These include aligning moment from lateral force and turn slip [19] that results from any deviation in the wheel travel direction from the Ackermann turning geometry. Furthermore, non-zero static toe angle, which is common in many standard vehicle alignment specifications, results in additional deviation from the ideal case and must be compensated to determine accurate estimates of friction coefficient. Fortunately, these torques have been observed on the research vehicle to be relatively small, roughly 10-15 Nm in magnitude, compared to the magnitude of the steering scrub torque of 100-200 Nm. In practical terms, this means that the estimator will not detect subtle friction changes on similar surfaces but would be easily able to discern wet or icy pavement from dry pavement and provide early warning to a driver or preliminary data to a driver assistance or autonomous driving system. In low friction situations, these results indicate that lower values of $\mu$ are more discernible in terms of allowing larger ranges of conditions to provide sufficient excitation, but the actual friction would be less identifiable due to reduced signal-to-noise ratios associated with parasitic torque contributions.

Also interesting is the issue of changing tires on the vehicle. Replacement with the same or similar tires would be expected to preserve the accuracy of the algorithm, but a customer choice to change to wider tires or tires with a significantly different construction might yield a significantly different vertical pressure distribution and thus different steering torques. The algorithm is not designed to yield an absolute friction coefficient for any given combination of tires and road surface. However, it is capable of detecting the difference between an inferred "normal" condition and low-friction conditions such as wet or icy roads. As a result, a fully integrated system with a new tire install might need a short period of time to learn a new "normal" baseline steering torque for dry asphalt, but thereafter would be capable of detecting adverse surface conditions. Additionally, one could envision that a tire re-calibration process could be done to re-train an estimator, as part of a new tire installation process, especially as this process could be done in a controlled garage setting, without driving, within a few tens of seconds.

Experimental Friction Identification on Constant Surfaces

To validate the friction estimation approach, data were recorded from an additional set of experiments. In the first experiment, manoeuvres with conditions identical to those performed on asphalt were repeated on a patch of asphalt covered with a thin layer of cracked-corn. While data from wet or icy surfaces would be ideal, the equipment of the experimental vehicle is not waterproof, and thus dry media is utilised for lowering surface friction conditions. FIG. 37 provides a comparison between two data sets taken on the two surfaces, both at 0.2 m/s longitudinal speed and a steering rate of 20 degrees/second. The plot demonstrates that the tire torque measurement exhibits the same behaviour in both cases, with similar transient time and roll-out relaxation dynamics. The key difference, as predicted by the model in the previous sections, is that the steady value of the torque is approximately halved when operating on the corn-covered low friction surface.

Since this experiment was conducted such that steady steering rates were present for a sufficient duration, the conditions of Equation (22) were satisfied from approximately 0.4 s to 0.9 s during the manoeuvre. The data from this time period for each trial were averaged and inverted using Equation (21) to yield a single friction value for the estimation time window. Note also here that at 20 degrees/second, the planar condition is barely satisfied for dry asphalt and thus error in the measurements will mainly end up lowering the estimated friction coefficient.

The experiment on corn was repeated at the same set of steering rates as previously performed on asphalt: 0.1, 0.2, 0.5, 1.0, 2.0, 5.0, 10.0, and 20.0 deg/s, and multiple trials were performed at each steering rate. FIG. 38 illustrates the data, with one trial plotted for each experimental condition. This figure can be compared to FIG. 32, which illustrated the manoeuvres on asphalt. Similar to FIG. 37, the transient behaviours are approximately the same with the key difference being the magnitude of the steady response. One difference is in the variability within the steady state of a single trial, a known effect that can result from the movement of the cracked corn media under the tire. FIG. 7 also provides a plot of the experimental steady-state values, where each of the multiple markers at the various steering rates represents one experimental trial. The plot also provides the experimental values obtained at steady-state via dash-dotted lines and a curve of the response of the model with a hand-tuned friction coefficient and a slightly lowered brush stiffness value. The necessity of lowering the brush stiffness to account for operation on granular media has been seen in the literature for gravel and snow [24]. However, the need to lower the stiffness would likely not occur for wet or icy pavement given that the surfaces are solid. The two plots of FIGS. 33 and 34 illustrate that the model is capable of matching the steady-state tire scrub torques at both low and high steering rates and can capture the effect of low friction conditions.

Experimental Friction Observability on Time-Varying Surfaces

Figure 39:
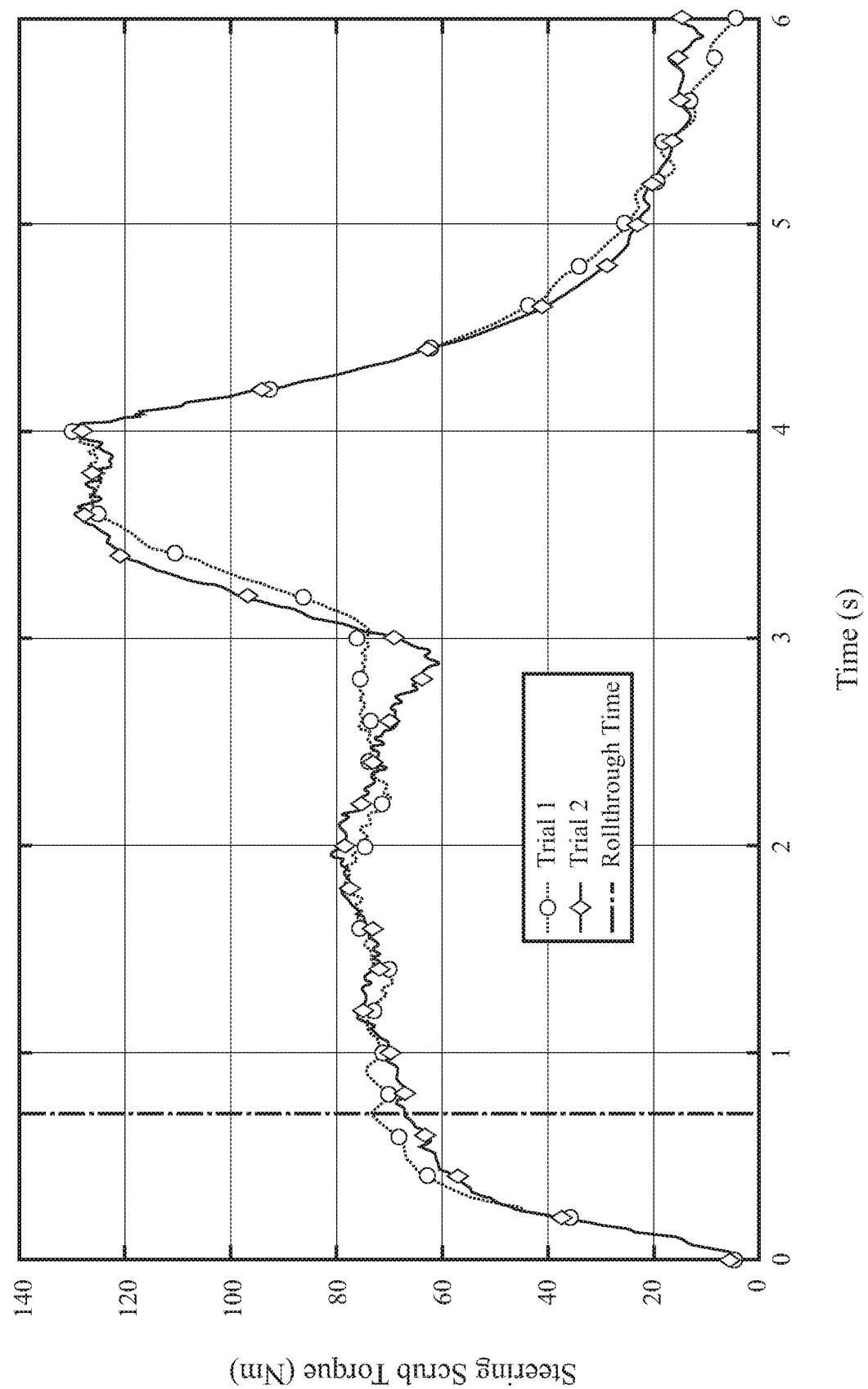
FIG. 39 is a plot showing experimental data for transition from corn-covered asphalt to dry asphalt.

While it is an unlikely case that the vehicle would roll from one surface to another at the low speeds under consideration in this work, an experiment was conducted to confirm that it is possible to rapidly discern the transition between two surfaces. FIG. 39 demonstrates this effect with two trials at a steering rate of 5 degrees/second and a velocity of 0.2 m/s. The manoeuvre was initiated on the corn-covered asphalt surface and at approximately 3 seconds into the manoeuvre the vehicle rolled off of the corn patch and onto dry asphalt. The transition can be seen clearly in FIG. 39 where the steering scrub torque suddenly ramps up from the steady value at approximately 75 Nm on corn. Though the exact transition times for each trial are not known precisely, it can also be seen that approximately 0.7 seconds later, or the time to roll one contact patch, the torque reaches a steady value of approximately 125 Nm. This manoeuvre was designed at 5 degrees/second in order to yield a full four seconds of steering ramp in which to transition from one surface to the other, reaching a steady value on each. As a result of the slower steering rate, brush saturation is not guaranteed for either phase of the manoeuvre and explicit friction estimation cannot be performed on the data. However, the values obtained in each steady torque time period are consistent with the model results in FIGS. 33 and 34 for each surface.

In one example, the method according to the present invention includes providing a brush model for a description of the steering torque across a contact patch between the automotive tire and road surface, measuring the steering torque at a wheel velocity and a steering rate, and estimating the friction coefficient based on the measurements of the steering torque and the brush model.

For the case of a stationary vehicle, the steering torque depends on a tire brush vertical load distribution and relative motion of tire brushes and the road surface.

For the brush model of the present invention, the steering torque is determined across the contact patch by breaking up the contact patch into individual tread elements and integrating tire brush vertical load distribution over the contact patch, where the vertical load distribution and the relative motion of the tire brushes and the road surface each vary throughout the contact patch.

For the case of a slow-rolling vehicle, the brush model further comprises rolling relaxation dynamics of the tire, including determining positions of tire brushes and change of the tire brush vertical load distribution due to the rolling motion of the tire as the tire brushes enter or leave the contact patch such that tire brush vertical load distribution across the contact patch is updated at any given moment during a period.

As will be clear to those of skill in the art, the embodiments of the present invention illustrated and discussed herein may be altered in various ways without departing from the scope or teaching of the present invention. Also, elements and aspects of one embodiment may be combined with elements and aspects of another embodiment. It is the following claims, including all equivalents, which define the scope of the invention.

The invention claimed is:

1. A device for estimating a friction coefficient between a road surface and an automotive tire through determination of a steering moment during a steering maneuver of a slow-rolling or stationary vehicle, comprising:
   a computer configured for constructing a brush model for a description of the steering moment across a contact patch between the automotive tire and road surface, the steering moment being a moment acting on a steering axis required to overcome resistance to tire twisting on the road surface at a wheel velocity and a steering rate, the steering moment depending on a tire brush vertical load distribution and relative motion of tire brushes on the tire and the road surface;
   sensors for measuring the wheel velocity and the steering rate; and
   mechanism for measurements or estimation of the steering moment;
   the computer further adapted for estimating the friction coefficient based on the measurements or estimation of the steering moment and the brush model;
   wherein the wheel velocity is not greater than a predetermined value.

2. The device of claim 1, wherein the brush model comprises the steering moment being determined across the contact patch by breaking up the contact patch into individual tread elements and integrating tire brush vertical load distribution over the contact patch, wherein the vertical load distribution and the relative motion of the tire brushes and the road surface each vary throughout the contact patch.

3. The device of claim 2, wherein the brush model further comprises rolling relaxation dynamics of the tire, wherein the computer is further adapted for determining positions of tire brushes and change of the tire brush vertical load distribution due to the rolling motion of the tire as the tire brushes enter or leave the contact patch such that tire brush stress distribution across the contact patch is updated at any given moment during a period.

4. The device of claim 3, wherein the contact patch comprises a leading edge and a trailing edge relative to the rolling direction, the determination of the brush stress distribution due to the rolling motion comprises the brush stresses in the patch shifting to a new location in the contact patch, where the shift operation includes saturation of the brush stress to the smallest encountered product of friction coefficient and vertical pressure, and the tire brushes in the leading edge being relaxed as the tire rolls forward in the rolling direction, and the brushes traveling past the trailing edge being zeroed as they leave the patch.

5. The device of claim 1, wherein modeling of the vertical load distribution is selected from uniform load distribution, quartic load distribution, parabolic load distribution, and a combined polynomial load distribution.

6. The device of claim 1, wherein the contact patch comprises saturated and unsaturated regions in the contact patch used for the determination of the brush stress distribution due to the steering motion.

7. The device of claim 1, wherein the friction coefficient is estimated at a minimum steering angle required for all of the tread elements in the contact patch to be in the saturated condition.

8. The device of claim 1, wherein the wheel velocity and steering rate each are a constant or a nearly constant rate.

9. The device of claim 1, wherein the road surface is locally level and the friction coefficient is uniform throughout the contact patch.

10. The device of claim 1, wherein when the wheel velocity is zero, the friction coefficient between the tire and driving surface is approximated by ratio of the steering moment generated due to steering motion when all the brushes are saturated to the integrated product of the vertical pressure distribution and location of the differential elements being integrated.

11. The device of claim 1, where when a measured vehicle steering rate, a measured steering moment, and a measured wheel rotation rate meet an inequality criterion, the friction coefficient between the tire and road surface is approximated by the ratio of the steering moment when all the brushes are saturated to the integrated product of the vertical pressure distribution and location of the differential elements being integrated.

12. The device of claim 1, wherein a finite state machine is used to determine whether the majority of the brushes in the contact patch are saturated.

13. The device of claim 1, wherein the steering moment is measured by force transducers or is estimated from steering system loads.

14. A method of estimating a friction coefficient between a tire and a road surface for a slow-rolling or stationary automotive, the method comprising:
   providing a brush model for a description of a steering moment across a contact patch between the automotive tire and road surface, the steering moment being a moment acting on a steering axis required to overcome resistance to tire twisting on the road surface at a wheel velocity and a steering rate, the steering moment depending on a vertical load distribution and relative motion of tire brushes on the tire and the road surface;
   measuring the wheel velocity and the steering rate;
   providing measurements or estimation of the steering moment; and
   estimating the friction coefficient based on the measurements or estimation of the steering moment and the brush model;
   wherein the wheel velocity is not greater than a predetermined value.

15. The method of claim 14, wherein the brush model comprises the steering moment being determined across the contact patch by breaking up the contact patch into individual tread elements and integrating tire brush vertical load distribution over the contact patch, wherein the vertical load distribution and the relative motion of the tire brushes and the road surface each vary throughout the contact patch.

16. The method of claim 14, wherein the brush model further comprises rolling relaxation dynamics of the tire, wherein the computer is further adapted for determining positions of tire brushes and change of the tire brush vertical load distribution due to the rolling motion of the tire as the tire brushes enter or leave the contact patch such that tire brush vertical load distribution across the contact patch is updated at any given moment during a period.

17. The method of claim 16, wherein the contact patch comprises a leading edge and a trailing edge relative to the rolling direction, the determination of the brush stress distribution due to the rolling motion comprises the brush stresses in the patch shifting to a new location in the contact patch, where the shift operation includes saturation of the brush stress to the smallest encountered product of friction coefficient and vertical pressure, and the tire brushes in the leading edge being relaxed as the tire rolls forward in the rolling direction, and the brushes traveling past the trailing edge being zeroed as they leave the patch.

18. The method of claim 14, wherein the friction coefficient is estimated at a minimum steering angle required for all of the tread elements in the contact patch to be in the saturated condition.

19. The method of claim 14, wherein the wheel velocity and steering rate each are a constant or a nearly constant rate.

20. The method of claim 14, wherein the steering moment is measured by force transducers or estimated from steering system loads.

* * * * *